United States Patent
Zhao et al.

(10) Patent No.: US 12,226,988 B2
(45) Date of Patent: Feb. 18, 2025

(54) STICKING MACHINE

(71) Applicants: FU DING ELECTRONICAL TECHNOLOGY (JIASHAN) CO., LTD., Jiashan (CN); FUZHUN PRECISION TOOLING (JIASHAN) CO., LTD., Jiaxing (CN)

(72) Inventors: Zhen-Lin Zhao, Jiashan (CN); Min Liu, Kunshan (CN); Wen-Jin Xia, Kunshan (CN); Wei-Wei Wu, Kunshan (CN); Wei-Ping Li, Kunshan (CN); Huo-Zhong Wu, Jiashan (CN)

(73) Assignees: FU DING ELECTRONICAL TECHNOLOGY (JIASHAN) CO., LTD., Jiashan (CN); FUZHUN PRECISION TOOLING (JIASHAN) CO., LTD., Jiaxing (CN)

( * ) Notice: Subject to any disclaimer, the term of this patent is extended or adjusted under 35 U.S.C. 154(b) by 195 days.

(21) Appl. No.: 18/010,784

(22) PCT Filed: Oct. 30, 2020

(86) PCT No.: PCT/CN2020/125579
§ 371 (c)(1),
(2) Date: Dec. 15, 2022

(87) PCT Pub. No.: WO2022/088109
PCT Pub. Date: May 5, 2022

(65) Prior Publication Data
US 2023/0321964 A1    Oct. 12, 2023

(51) Int. Cl.
B32B 37/00  (2006.01)
B32B 38/10  (2006.01)

(52) U.S. Cl.
CPC .......... B32B 37/0053 (2013.01); B32B 38/10 (2013.01)

(58) Field of Classification Search
None
See application file for complete search history.

(56) References Cited

FOREIGN PATENT DOCUMENTS

CN    108297523 A    7/2018

*Primary Examiner* — Barbara J Musser
(74) *Attorney, Agent, or Firm* — ScienBiziP, P.C.

(57) ABSTRACT

A sticking machine able to automatically remove films on either side of a sheet to be pasted to a workpiece includes a sheet supply component, a sheet selection component, a drive component, a first film-removing component, a second film-removing component, a carrier, and a transmission line. The sheet supply component stores sheets. The sheet selection component applies suction to the sheet. The first film-removing component tears off a first film, the second film-removing component tears off a second film on the reverse side. The transmission line carries the workpiece to the carrier. The sticking machine is fed by the sheet supply component, and after removal of the first film, the sheet selection component lays the sheet on the surface of the workpiece, then the second film-removing component tears off the second film, realizing automatic sticking of the sheet on the workpiece, improving the processing efficiency and accuracy.

18 Claims, 16 Drawing Sheets

STICKING MACHINE

FIELD

The subject matter herein generally relates to a sticking machine, particularly relates to a sticking machine which can automatically remove a film from a sheet and stick a sheet to a workpiece.

BACKGROUND

Now, when a to-be-sticked member, such as a graphite sheet, is sticked to a workpiece, a release paper should first be torn off from an adhesive surface of the graphite sheet, then the graphite sheet is attached to the workpiece, and a protective paper on the non-adhesive surface of the graphite sheet is torn off as a final step. In assembly, the above described traditional method to remove a film is carried out manually, and has low efficiency and low precision.

SUMMARY

In view of that described above, it is necessary to provide a sticking machine that can automatically remove or tear off a film from or apply a film to the workpiece.

This application provides a sticking machine comprising a sheet supply component, a sheet selection component, a first film-removing component, a second film-removing component, a carrier, a transmission line, a drive component, and a base board. The sheet supply component is configured for storing sheets. The sheet selection component is configured for applying a suction force to the sheets stored in the sheet supply component. The second film-removing component is connected to the sheet selection component. The carrier is configured for positioning a workpiece. The transmission line is located above the carrier and configured for transmitting the workpiece to the carrier. The drive component is connected to the sheet selection component and the second film-removing component. The base board is configured for supporting the sheet supply component, the first film-removing component, the drive component, the carrier, and the transmission line. The drive component drives the sheet selection component to move above the first film-removing component after the sheet selection component picks up a sheet from the sheets stored in the sheet supply component, the first film-removing component grips a first film on the sheet, the drive component and the first film-removing component move to tear off the first film from the sheet, the drive component moves the sheet selection component to the workpiece on the carrier, the sheet selection component pastes the sheet to the workpiece, the second film-removing component grips a second film on the sheet, the drive component and the second film-removing component move to tear off the second film from the sheet.

Furthermore, in some embodiments, the sticking machine further comprises a rolling component, the rolling component is located between the sheet selection component and the second film-removing component, the rolling component is configured to smooth the sheet on the workpiece, the rolling component comprises a roller and a lifting cylinder, the roller is configured to press the sheet onto the workpiece.

Furthermore, in some embodiments, the first film-removing component is located on the base board, the first film-removing component comprises a jaw cylinder, a first jaw, and a second jaw, the first jaw and the second jaw are configured to cooperatively grip the first film, the jaw cylinder is located on the base board, the jaw cylinder moves the first jaw and the second jaw closer to or away from each other to grip or release the first film.

Furthermore, in some embodiments, the first film-removing component is rotatably connected to the base board, the first film-removing component comprises a jaw cylinder, a first jaw, a second jaw, a cube cylinder, an arc track, a connecting piece, a link, and a bearing. One end of the connecting piece is connected to the cube cylinder, the other end of the connecting piece is connected to one end of the link, the other end of the link is connected to the bearing. The bearing is mounted in the arc track, the jaw cylinder is connected to the link, as the cube cylinder drives the connecting piece to move, the connecting piece rotates each of the link, the jaw cylinder, the first jaw, and the second jaw.

Furthermore, in some embodiments, the base board defines a first connecting hole and a second connecting hole, the first connecting hole is positioned for the first film to drop through, the second connecting hole is located on a side of the first film-removing component closer to the transmission line, and the second connecting hole is positioned for the second film to drop through.

Furthermore, in some embodiments, each of the first connecting hole and the second connecting hole is connected to a storage box, the first film and the second film drop into the storage box.

Furthermore, in some embodiments, the sheet selection component comprises a fixing board, an adsorbing board, a spring, and a guiding piece, the fixing board is mounted on the drive component, the adsorbing board is located below the fixing board, one end of the guiding piece is connected to the adsorbing board, the other end of the guiding piece extends through the fixing board; the spring is between the fixing board and the adsorbing board. The spring pushes the adsorbing board downward, the adsorbing board defines a plurality of absorbing holes for applying the suction force to the sheets in the sheet supply component.

Furthermore, in some embodiments, the second film-removing component comprises a supporting piece, a supporting piece, a pushing cylinder, a linkage mechanism, and a pressing piece, the supporting piece is mounted on the drive component, the supporting piece and the pushing cylinder are mounted on the supporting piece, the supporting piece defines an absorbing hole for applying the suction force to the second film, the pressing piece connects to the pushing cylinder by the linkage mechanism, the pushing cylinder presses the pressing piece against the supporting piece, the supporting piece and the pressing piece are configured to cooperatively grip the second film.

Furthermore, in some embodiments, the linkage mechanism comprises a guiding pole, a pushing piece, and a link, the guiding pole is mounted on the supporting piece, the pushing piece is connected to the guiding pole, the pushing piece comprises a sliding part, the pressing piece defines a holding groove, the sliding part is located in the holding groove, the pressing piece is connected to the supporting piece by the link, the pushing cylinder swings the pressing piece towards the supporting piece.

Furthermore, in some embodiments, the carrier comprises a substrate, at least two first centering pieces, at least two second centering pieces, a cylinder, a first trail, a second trail, and a link mechanism, the substrate supports the workpiece, the first trail and the second trail extend in a first direction and a second direction respectively, the first centering piece and the second centering piece are mounted on the substrate and are configured to grip the sheet, the cylinder is located on the substrate, the cylinder moves the first centering piece and the second centering piece by the link mechanism closer to or away from each other to grip or release the sheet.

Furthermore, in some embodiments, the link mechanism comprises a slider, a first link rod, a second link rod, and a guiding post, the slider is connected to the cylinder and the guiding post, the guiding post extends in the first direction to guide the slider, the first link rod is rotatably mounted on the substrate, the slider and the first centering piece on same side are connected to the two ends of the first link rod, the first centering piece on opposite side is connected to the slider, the slider and the second centering piece are connected to the two ends of the second link rod, the slider moves in the first direction, the first centering pieces and the second centering pieces are configured to cooperatively grip the sheet.

Furthermore, in some embodiments, the transmission line comprises two which are parallel to each other, a top-support-guide wheel, a bottom-support-guide wheel, a side-support-guide wheel, and a belt-lifting motor, each of the two belts is configured to transmit the workpiece, the bottom-support-guide wheel, the side-support-guide wheel, and the bottom-support-guide wheel support two belts, the belt-lifting motor connects to the top-support-guide wheel to lift or to drop the top-support-guide wheel and the two belts.

This application provides a sticking machine comprising a sheet supply component, a sheet selection component, a drive component, a first film-removing component, a second film-removing component, a carrier, and a transmission line. The sheet supply component is configured for storing sheets with an upper film and a lower film on each surface. The sheet selection component is configured for applying a suction force to the sheets stored in the sheet supply component. The drive component is connected to the sheet selection component and is configured to move the sheet selection component in a first direction and a second direction. The second film-removing component is connected to the sheet selection component. The carrier is configured for positioning a workpiece. The transmission line is located above the carrier. The transmission line extends in a third direction and is configured for transmitting the workpiece in the third direction to the carrier. The drive component drives the sheet selection component to move in first direction to the sheet supply component for picking up the sheet. The drive component and the first film-removing component tear off the upper film from the sheet, the drive component drives the sheet selection component to move in the second direction to press the sheet onto the workpiece, the drive component and the second film-removing component move to tear off the lower film.

Furthermore, in some embodiments, the sticking machine further comprises a rolling component, the rolling component is located between the sheet selection component and the second film-removing component, the rolling component is configured to smooth the sheet on the workpiece, the rolling component comprises a roller and a lifting cylinder, the roller is configured to press the sheet onto the workpiece.

Furthermore, in some embodiments, the first film-removing component comprises a jaw cylinder, a first jaw, and a second jaw, the first jaw and the second jaw are configured to cooperatively grip the upper film, the jaw cylinder drives the first jaw and the second jaw to move closer to or away from each other to grip or release the upper film.

Furthermore, in some embodiments, the first film-removing component comprises a jaw cylinder, a first jaw, a second jaw, a cube cylinder, an arc track, a connecting piece, a link, and a bearing, one end of the connecting piece is connected to the cube cylinder, the other end of the connecting piece is connected to one end of the link, the other end of the link is connected to the bearing, the bearing is mounted in the arc track, the jaw cylinder is connected to the link, as the cube cylinder drives the connecting piece to move, the connecting piece rotates each of the link, the jaw cylinder, the first jaw, and the second jaw.

Furthermore, in some embodiments, the second film-removing component comprises a supporting piece, a supporting piece, a pushing cylinder, a linkage mechanism, and a pressing piece, the supporting piece is mounted on the drive component, the supporting piece and the pushing cylinder are mounted on the supporting piece, the supporting piece defines an absorbing hole for applying the suction force to the lower film, the pressing piece is connected to the pushing cylinder by the linkage mechanism, the pushing cylinder drives the pressing piece to press against the supporting piece, the supporting piece and the pressing piece are configured to cooperatively grip the lower film.

Furthermore, in some embodiments, the sticking machine further comprises a base board supporting the sheet supply component, the first film-removing component, the drive component, the carrier, and the transmission line, the base board defines a first connecting hole and a second connecting hole, the second connecting hole is located on a side of the first film-removing component close to the transmission line, each of the first connecting hole and the second connecting hole is connected to storage box, the storage box is configured to store the upper film and the lower film.

The machine described above first takes material from the sheet supply component through the sheet selection component, then tears off the first film through the first film-removing component, then the drive component drives the sheet selection component to attach the sheet to the surface of the workpiece, and finally the drive component drives the second film-removing component to tear off the second film, realizing the purpose of automatically sticking the sheet to the workpiece, and improves the processing efficiency and accuracy.

DETAILED DESCRIPTION

Figure 1:
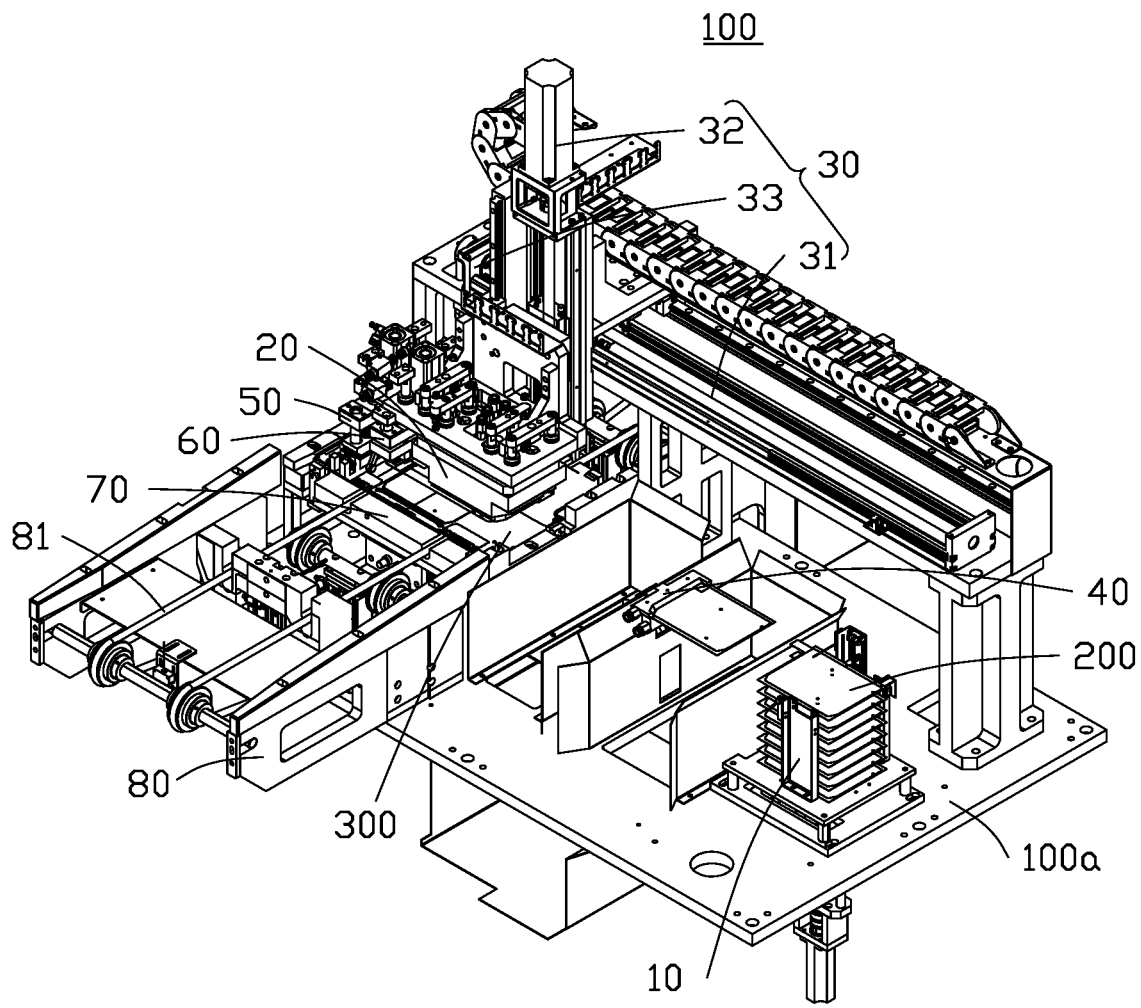
FIG. 1 is an isometric view of a sticking machine according to an embodiment of this application.

The technical solutions of the present application will be described below in conjunction with the accompanying drawings in the embodiments of the present application. The described embodiments are only some of the embodiments of the present application, rather than all the embodiments.

It should be noted that when a component is referred to as being "fixed to" another component, it can be directly on the other component or can be indirectly fixed to the component. When a component is said to be "connected" to another component, it can be directly connected to the other component or there may be an intervening component at the same time. When a component is said to be "set on" another component, it can be directly set on the other component. A centered component exists on a component or possibly both. The terms "vertical," "horizontal," "left," "right," and similar expressions are used herein for purposes of illustration only.

Unless otherwise defined, all technical and scientific terms used herein have the same meaning as commonly understood by those skilled in the technical field of the application. The terms used herein in the description of the application are only for describing specific embodiments purpose, is not intended to limit the application. As used herein, the term "or/and" includes any or all combinations of one or more of the associated listed items.

This application provides a sticking machine comprising a sheet supply component, a sheet selection component, a first film-removing component, a second tearing, component, a carrier, a transmission line, a drive component, and a base board. The sheet supply component is configured for storing sheets. The sheet selection component is configured for applying suction to the sheets. The second film-removing component is connected to the sheet selection component. The carrier is configured for positioning a workpiece. The transmission line is located above the carrier and configured for transmitting the workpiece to the carrier. The drive component is connected to the sheet selection component and the second film-removing component. The base board is configured for supporting the sheet supply component, the first film-removing component, the drive component, the carrier, and the transmission line. The drive component drives the sheet selection component to move above the first film-removing component after taking the sheet, the first film-removing component grips the first film on the sheet, the drive component and the first film-removing component move relatively to tear off the first film from the sheet, the drive component drives the sheet selection component to move to the workpiece on the carrier, the sheet selection component sticks the sheet to the workpiece, the second film-removing component grips the second film on the sheet, the drive component and the second film-removing component move relatively to tear off the second film.

This application provides a sticking machine comprising a sheet supply component, a sheet selection component, a drive component, a first film-removing component, a second film-removing component, a carrier, and a transmission line. The sheet supply component is configured for storing sheet with an upper film and a lower film. The sheet selection component is configured for applying suction to the sheets. The drive component is connected to the sheet selection component and is configured to drive the sheet selection component to move in a first direction and a second direction. The second film-removing component is connected to the sheet selection component. The carrier is configured for positioning a workpiece. The transmission line is located above the carrier. The transmission line extends in a third direction and is configured for transmitting the workpiece in the third direction to the carrier. The drive component drives the sheet selection component to move in first direction to the sheet supply component for taking the sheet, the drive component and the first film-removing component move relatively to tear off the upper film from the sheet, the drive component drives the sheet selection component to move in the second direction to press the sheet to the workpiece, the drive component and the second film-removing component move relatively to tear off the lower film.

The above machine first takes material from the sheet supply component through the sheet selection component, then tears off the first film through the first film-removing component, then drives the sheet selection component through the drive component to attach the sheet to the surface of the workpiece, and finally drives the second film-removing component through the drive component to tear off the second film, realizing the purpose of automatically sticking the sheet to the workpiece, and improves the processing efficiency and accuracy.

In the following, some embodiments of the present application will be described in detail with reference to the accompanying drawings. The following embodiments and the features in the embodiments can be combined with each other under the condition of no conflict.

FIG. 1 is an isometric view of a sticking machine 100 according to an embodiment of this application. The sticking machine 100 is used for sticking a sheet 200 to a workpiece. The sticking machine 100 includes a base board 100a, a sheet supply component 10, a sheet selection component 20, a drive component 30, a first film-removing component 40, a second film-removing component 50, a rolling component 60, a carrier 70, and a transmission line 80. The sheet supply component 10 is used for storing a number of the sheets 200 to be pasted. The sheet 200 has a first film and a second film on both sides. Specifically, in this embodiment, the first film is a release paper on the adhesive surface of the sheet 200, and the first film is on the lower surface of the sheet 200. The second film is a protective paper on the non-adhesive surface of the sheet 200, and the second film is on the upper surface of the sheet 200. In order to facilitate the handling of the sheet 200, the area of the release paper is larger than the area of the sheet 200.

The sheet selection component 20, the second film-removing component 50, and the rolling component 60 are mounted together on the drive component 30. The drive component 30 drives the sheet selection component 20, the second film-removing component 50, and the rolling component 60 to move together to the sheet supply component 10, to allow the sheet selection component 20 to take one sheet 200 to the first film-removing component 40. Then the drive component 30 drives the sheet selection component 20 with the sheet 200 to move to the first film-removing component 40, allowing the first film-removing component 40 to tear off the release paper from the sheet 200 and to expose the adhesive surface of the sheet 200. Then the drive component 30 drives the sheet selection component 20 and the sheet 200 without the release paper to move back to the top of the transmission line 80. The transmission line 80 is used for continuously transmitting the workpiece. When a workpiece moves above the carrier 70, the transmission line 80 moves down to drop the workpiece to the carrier 70 for positioning and preparing for attachment of the sheet 200. Then the drive component 30 drives the sheet selection component 20 to move down to paste the sheet 200 to the workpiece. After the pasting, the drive component 30 drives the sheet selection component 20, the rolling component 60, and the second film-removing component 50 to move up together to a default position. Then the rolling component 60 moves down relative to the sheet selection component 20, to smooth the sheet 200 on the workpiece. After the smoothing, the rolling component 60 resets, and the second film-removing component 50 moves down relative to the rolling component 60, to tear away the protective paper from the non-adhesive surface of the sheet 200. Then the transmission line 80 lifts the workpiece sticked with the sheet from the carrier 70, and the transmission line 80 transmits the workpiece sticked with the sheet to a next station. The drive component 30 further drives the sheet selection component 20 to pick up another sheet 200. By repeating the above steps, the sticking machine 100 automatically realizes the taking of sheets, tearing off the film on lower surface, pasting, pressing, and tearing off the film on upper surface.

Figure 3:
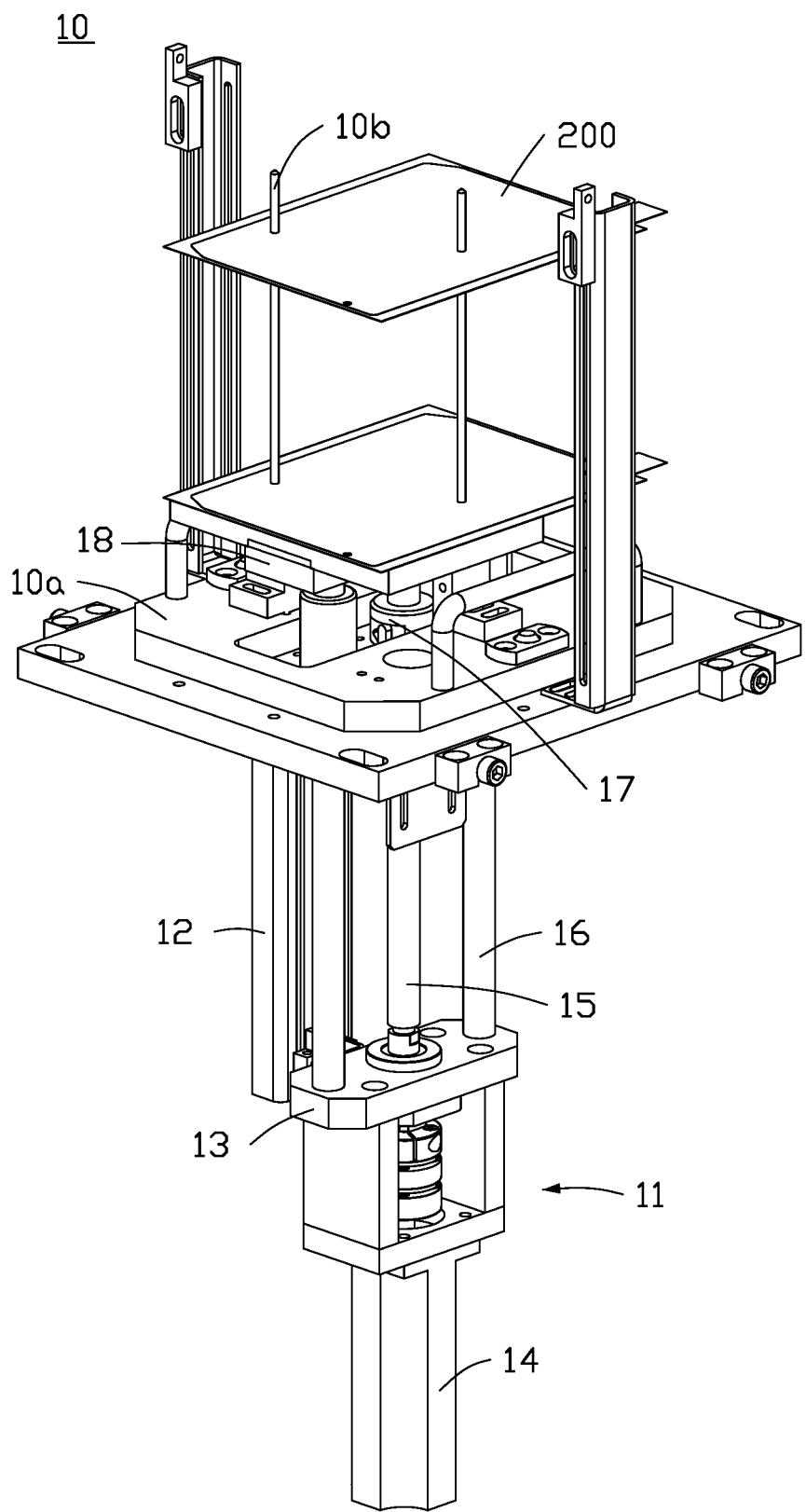
FIG. 3 is an isometric view of a sheet supply component according to an embodiment of this application.

FIG. 3 is an isometric view of a sheet supply component in FIG. 1. The sheet supply component 10 is mounted on the base board 100a. The sheet supply component 10 includes a base 10a and a lifting mechanism 11. The base 10a is positioned on the base board 100a. For precise positioning of the sheet 200, every sheet 200 has two positioning holes, and the base 10a has two positioning rods 10b. The relative positions of the positioning rods 10b correspond to the positions of the two positioning holes on the sheet 200, to allow insertion of the positioning rod 10b into the positioning hole of the sheet 200 to limit the movement of the sheet 200. In this embodiment, the sheet 200 is a graphite sheet in a flaky shape. A number of the graphite sheets are stored in stack on the base 10a. After the sheet selection component 20 picks up the sheet 200 on the top height away from the sheet supply component 10, the lifting mechanism 11 lifts the remaining sheets 200, until the lower sheet 200 moves to the top height. In order to prevent the sheet selection component 20 from interfering with the positioning rods 10b, after the sheet selection component 20 removes the top sheet 200, the lifting mechanism 11 should timely lift the next sheet 200. In some embodiments, the width of the gap between the positioning rod 10b and the positioning hole is 0~0.03 mm, to ensure accuracy.

As shown in FIG. 3, in some embodiments, the lifting mechanism 11 includes a lifting track 12, a lifting base 13, a motor 14, a screw rod 15, a guiding rod 16, a fixing piece 17, and a moving piece 18. The lifting track 12 is mounted on the bottom of the base 10a. The lifting base 13 is mounted on the lifting track 12 and is movable vertically. The motor 14 is mounted on the bottom of the lifting base 13 and is connected to the screw rod 15. The fixing piece 17 is positioned on the base 10a. The screw rod 15 is connected to the fixing piece 17 by a screw thread. Two guiding rods 16 are located on each side of the screw rod 15, and two guiding rods 16 movably extend through the base 10a. The moving piece 18 is located above the base 10a and is connected to the top of the guiding rod 16. The moving piece 18 is used for supporting a stack of the sheets 200. When the motor 14 rotates the screw rod 15 forward or in reverse, the screw rod 15 moves up or down under the limit of the fixing piece 17, and the lifting base 13 moves up or down along the lifting track 12, and the moving piece 18 moves up or down. After the sheet selection component 20 picks up the sheet 200 on the top height of the stack, the moving piece 18 moves up to lift the remaining sheets 200, until the lower sheet 200 moves to the top height, so the sheet selection component 20 can pick up the topmost sheet.

Specifically, in some embodiments, the base 10a has two beam sensors (not shown in figures). Beam sensors are located on each side of the sheet 200 and are used for sensing the position of the sheet 200, to ensure the accuracy of the sheet selection component 20 in picking up the sheets 200. The base 10a has an alarm (not shown in figures). When the sheets 200 are all taken, the alarm sounds, or is seen, to replenish the sheets 200.

Figure 2:
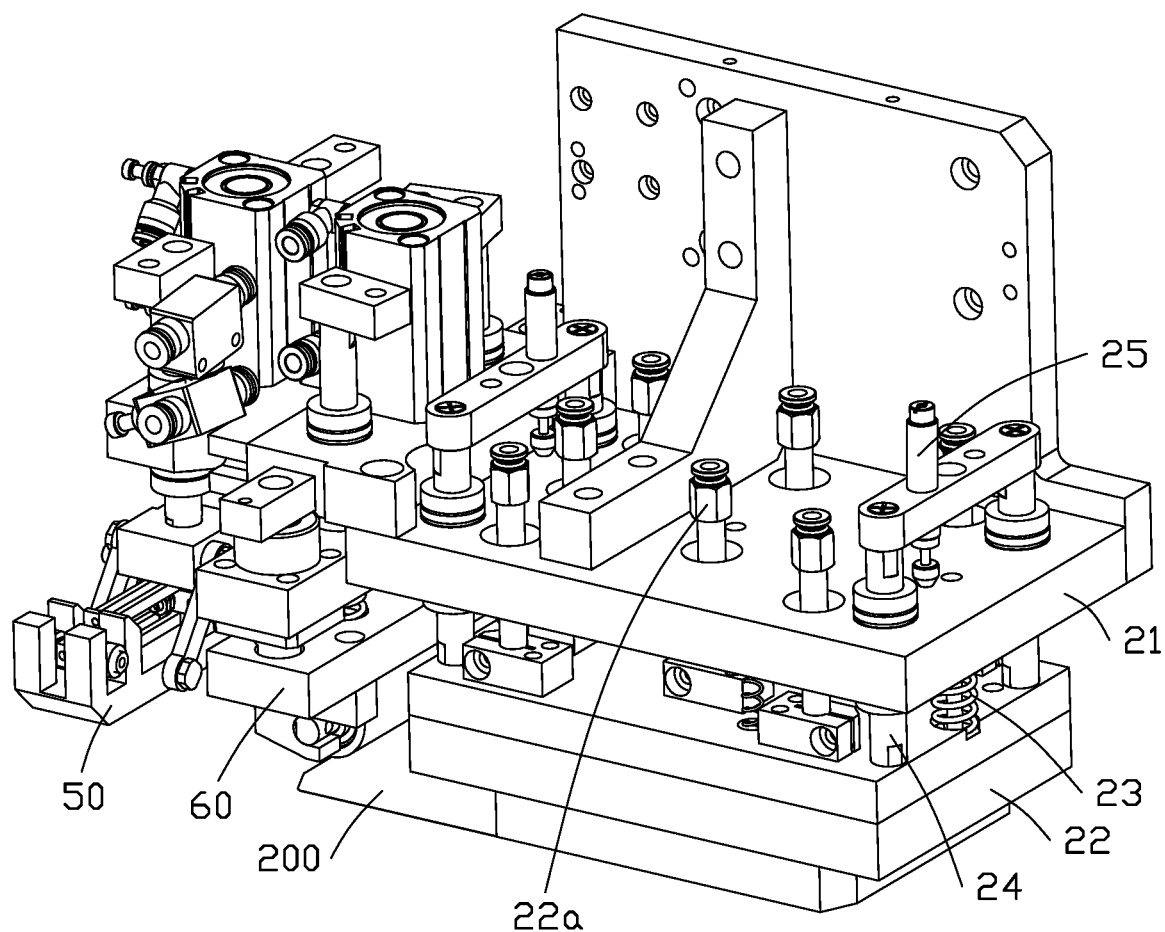
FIG. 2 is an isometric view of a sheet selection component, a rolling component, and a second film-removing component in the sticking machine of FIG. 1.
Figure 4:
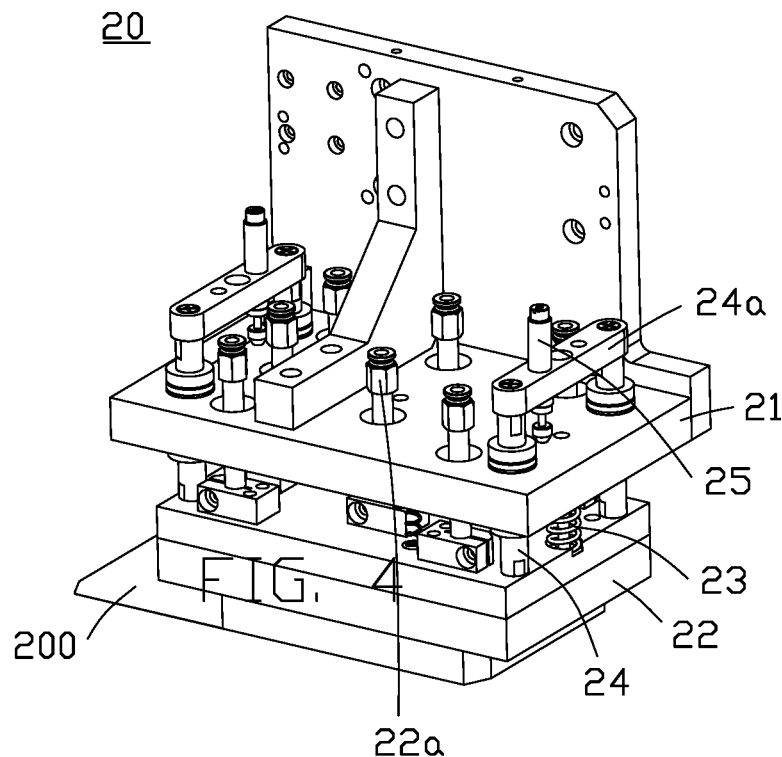
FIG. 4 is an isometric view of a sheet selection component according to an embodiment of this application.

As shown in FIG. 2, the sheet selection component 20, the second film-removing component 50, and the rolling component 60 are mounted on the drive component 30. When picking up the sheets 200, the sheet selection component 20, the second film-removing component 50, and the rolling component 60 move together to the sheet supply component 10, to allow the sheet selection component 20 to pick up the sheet. As shown in FIG. 4, the sheet selection component 20 includes a fixing board 21, an adsorbing board 22, a number of springs 23, and a number of guiding pieces 24. The fixing board 21 is mounted on the drive component 30 and connects the sheet selection component 20 to the drive component 30. The adsorbing board 22 is mounted on the bottom of the fixing board 21 and is used for applying suction to the sheet 200. One end of the guiding pieces 24 connects to the adsorbing board 22, and the other end of the guiding pieces 24 extends through the fixing board 21. The guiding pieces 24 guide the movement of the adsorbing board 22. The springs 23 are connected between the fixing board 21 and the adsorbing board 22. The springs 23 elastically push the adsorbing board 22 downward to press the sheet 200 to the workpiece. The adsorbing board 22 has a number of absorbing holes. Each absorbing hole connects to an air pump by a tube 22a. The air pump is used to generate negative air pressure to absorb the sheet 200. In some embodiments, the sheet selection component 20 has four guiding pieces 24 and two springs 23. Every two guiding pieces 24 are connected by a connecting board 24a. A blocker 25 is mounted on the connecting board 24a and is used for limiting the upward movement of the adsorbing board 22.

Figure 5:
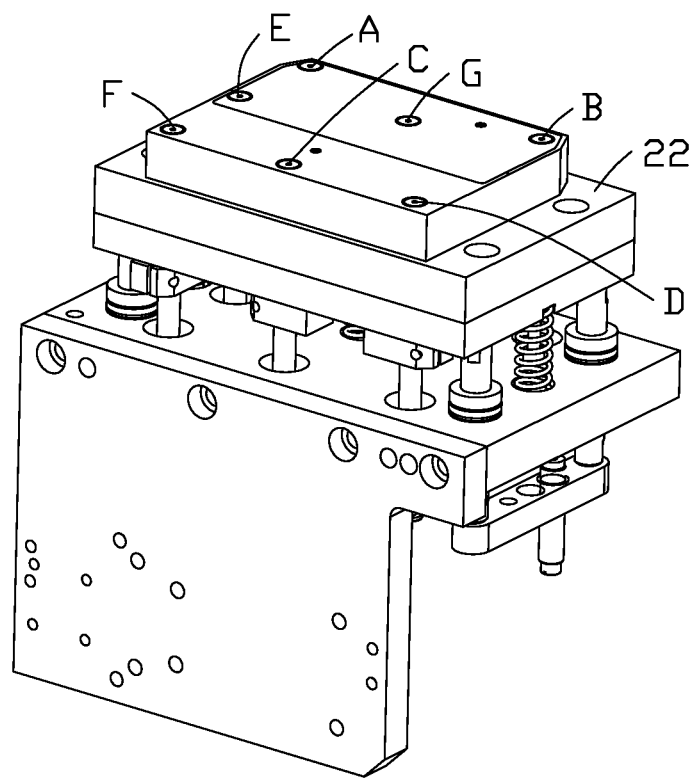
FIG. 5 is an isometric view of a bottom of the sheet selection component in FIG. 4.

For ensuring the positioning accuracy, the diameter of the positioning rod 10b (as shown in FIG. 3) is same as the diameter of the positioning hole. This may cause too much friction between the sheet 200 and the positioning rod 10*b* to cause failure in picking the sheet 200 up. Thus, the position of the absorbing holes on the adsorbing board 22 needs to be arranged to strengthen the suction and to increase the success rate of taking sheets. As shown in FIG. 5, in one embodiment, the adsorbing board 22 has seven absorbing holes on the bottom. The first absorbing hole A is located where greater torque is generated on the release paper during the tearing of the release paper, to prevent the sheet 200 falling out of position during the tearing of the release paper. The second absorbing hole B is used to apply suction to the back area of the sheet 200, to improve the stability of the sheet 200. The third absorbing hole C is located close to the two positioning rods 10*b*, and because this area has greater friction, the third absorbing hole C can reduce the force of picking sheets and increase the success rate of picking sheets. The fourth absorbing hole D is used to apply suction to the back area of the sheet 200, to improve the stability of the sheet 200. The fifth absorbing hole E is located at the tear-off point or line of the release paper, to prevent the sheet from moving out of place. The force of the sixth absorbing hole F and the third absorbing hole C is balanced to reach the best retrieving state. The seventh absorbing hole G is located close to the two positioning rods 10*b*, and because this area has greater friction, the seventh absorbing hole G can reduce the force when picking sheets and increase the success rate of picking sheets. In some other embodiments, the number and the positions of the absorbing holes on the adsorbing board 22 could be different.

Figure 6:
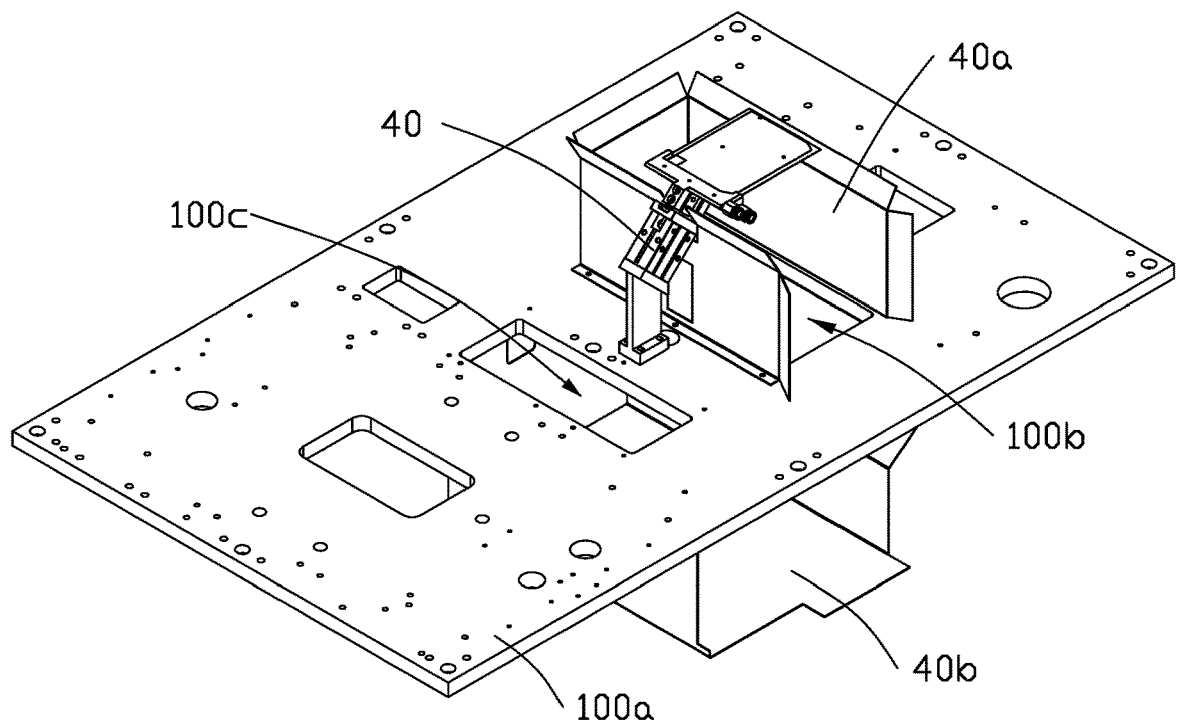
FIG. 6 is an isometric view of a first film-removing component and a base board according to an embodiment of this application.

The first film-removing component 40 is mounted on the base board 100*a* and is located on one side of the sheet supply component 10. As shown in FIG. 6, the upper surface of the base board 100*a* has a block wall 40*a*. The lower surface of the base board 100*a* has a storage box 40*b*. The base board 100*a* has a first connecting hole 100*b*. The block wall 40*a* and the storage box 40*b* form a cavity. The first connecting hole 100*b* communicates with the cavity. The first film-removing component 40 is used for tearing off the release paper from the sheet 200 above the block wall 40*a*. After the first film-removing component 40 releases the release paper, the release paper falls by gravity into the first connecting hole 100*b* in the block wall 40*a*. The block wall 40*a* ensures that the release paper does drop through the first connecting hole 100*b* into the storage box 40*b*. The storage box 40*b* is used to storing the release papers, for recycling release paper.

The base board 100*a* further has a second connecting hole 100*c*. The second connecting hole 100*c* is located on one side of the first film-removing component 40 and is located close to the transmission line 80. The second connecting hole 100*c* communicates with the storage box 40*b*. After the second film-removing component 50 tears off the protective paper from the sheet 200, the drive component 30 drives the second film-removing component 50 and the protective paper to move above the second connecting hole 100*c*. After the second film-removing component 50 releases the protective paper, the protective paper drops by gravity through the second connecting hole 100*c* into the storage box 40*b*, for recycling or other disposition of protective paper.

Figure 7:
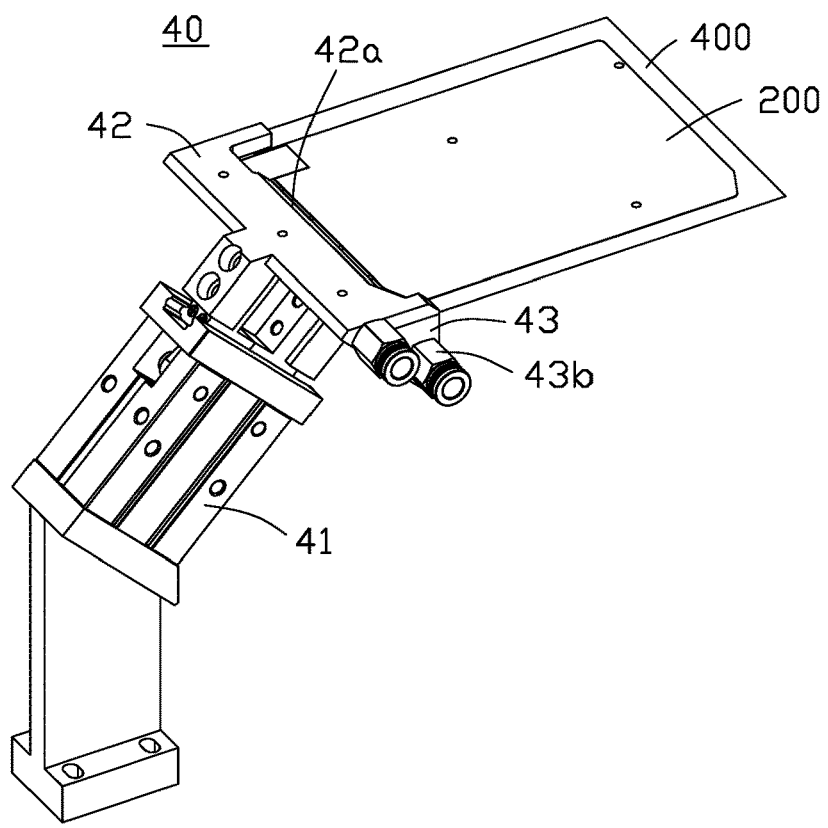
FIG. 7 is an isometric view of the first film-removing component of FIG. 6.
Figure 8:
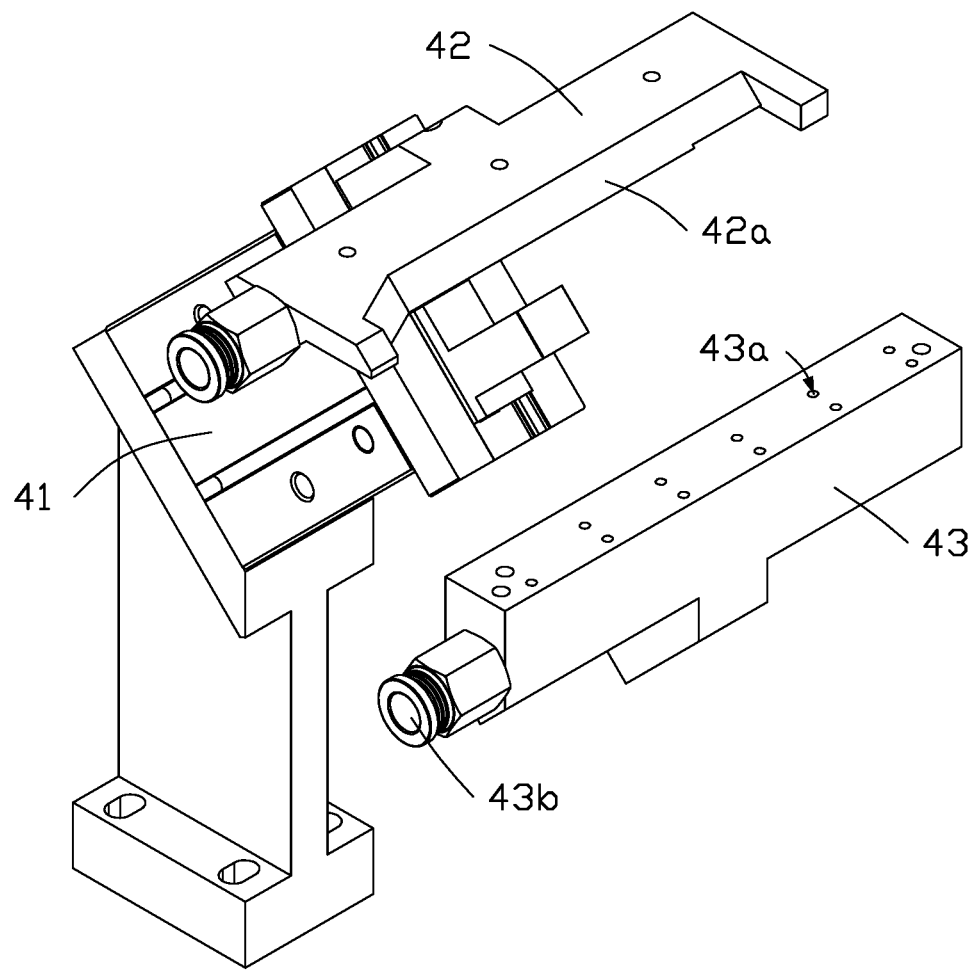
FIG. 8 is an exploded view of the first film-removing component of FIG. 7.

As shown in FIGS. 7 and 8, in one embodiment, the first film-removing component 40 is located on the base board 100*a*. The first film-removing component 40 includes a jaw cylinder 41, a first jaw 42, and a second jaw 43. For ease of gripping, the surface of the release paper 400 is greater in area than the surface of the sheet 200, and the first jaw 42 and the second jaw 43 take a grip of the release paper 400 on the area beyond the sheet 200. The gripping area is located on the front of the release paper 400 in the direction of movement of the sheet 200, so the release paper 400 can be torn off from the sheet 200 during the movement of the sheet 200, driven by the sheet selection component 20. The jaw cylinder 41 is mounted on the base board 100*a* and is used for driving the first jaw 42 and the second jaw 43 to move closer to or away from each other, to grip or release the release paper 400.

The side of the first jaw 42 facing to the sheet 200 has a bevel 42*a*. The bevel 42*a* forms a space facing the sheet 200, to allow the sheet selection component 20 to move with the sheet 20 to the front, so to tear away the release paper 400. The second jaw 43 has a number of suction holes 43*a* on the side to grip the release paper 400. The suction holes 43*a* communicate with each other in the second jaw 43 and are connected to an air pump by a connector 43*b* on the second jaw 43. The suction holes 43*a* are used to apply suction to the release paper 400 by the air pump to avoid the release paper 400 dropping from the first jaw 42 and the second jaw 43.

Figure 9:
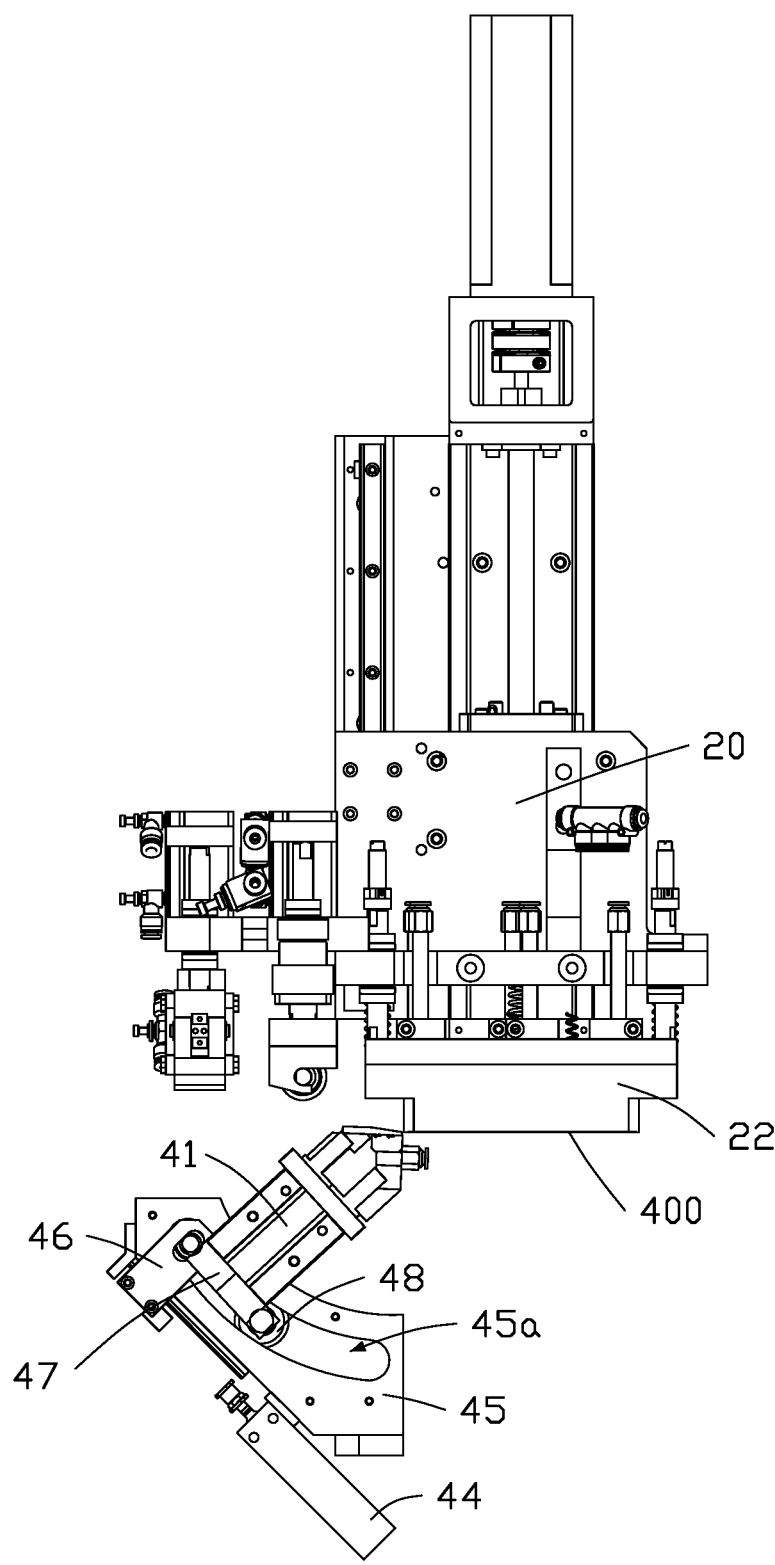
FIG. 9 is an isometric view of a first film-removing component according to another embodiment of this application.

As shown in FIG. 9, in another embodiment, the first film-removing component 40 is rotatably connected to the base board 100*a*, to assist the tearing off of the release paper 400, improving the efficiency of tearing off the release paper 400. In this embodiment, in addition to the jaw cylinder 41, the first jaw 42 and the second jaw 43 in the first embodiment, the first film-removing component 40 further includes a cube cylinder 44, an arc track 45, a connecting piece 46, a link 47, and two bearings 48. The arc track 45 is mounted on the base board 100*a*. The arc track 45 has an arc groove 45*a*. The radian of the arc groove 45*a* is equal to 90 degrees. The cube cylinder 44 is mounted on the bottom of the arc track 45. One end of the connecting piece 46 is immovably connected to the cube cylinder 44, the other end is rotatably connected to the link 47. The two bearings 48 are mounted on the two ends of the link 47 and movably mounted in the arc groove 45*a*. The jaw cylinder 41 is mounted on the link 47. When the first jaw 42 and the second jaw 43 grip the release paper 400, the cube cylinder 44 drives the connecting piece 46 to move down, meanwhile, the connecting piece 46 pulls the link 47 down. Because the link 47 moves along the arc groove 45*a* by the bearings 48, the linear motion of the connecting piece 46 turns into the curved motion of the link 47, which helps to tear off the release paper 400 from the sheet 200 more efficiently. In some other embodiments, the radian of the arc groove 45*a* could be 120 degrees, and so on.

As shown in FIG. 1, the drive component 30 includes a slide rail 31, a slide rail motor 33, and a lifter 32. A slide rail 31 is horizontal and is perpendicular to the transmission line 80. The lifter 32 is movably mounted on the slide rail 31. The slide rail motor 33 drives the lifter 32 to move along the slide rail 31 in a direction X to get closer to or further from the transmission line 80. The transmission line 80 transmits the workpiece in a direction Y. The sheet selection component 20 is mounted on the lifter 32. The lifter 32 drives the sheet selection component 20 to move in a direction Z to take or to paste the sheet.

Specifically, as shown in FIG. 1, one end of the slide rail 31 crosses over the transmission line 80. The sheet supply component 10 is located on the side of the slide rail 31 away from the transmission line 80. The first film-removing component 40 is located between the sheet supply component 10 and the transmission line 80. After the sheet selection component 20 picks up the sheet from the sheet supply component 10, the sheet selection component 20 moves to the first film-removing component 40 to have the release paper 400 torn off, then the sheet selection component 20 moves to the transmission line 80 to paste the sheet 200.

Figure 10:
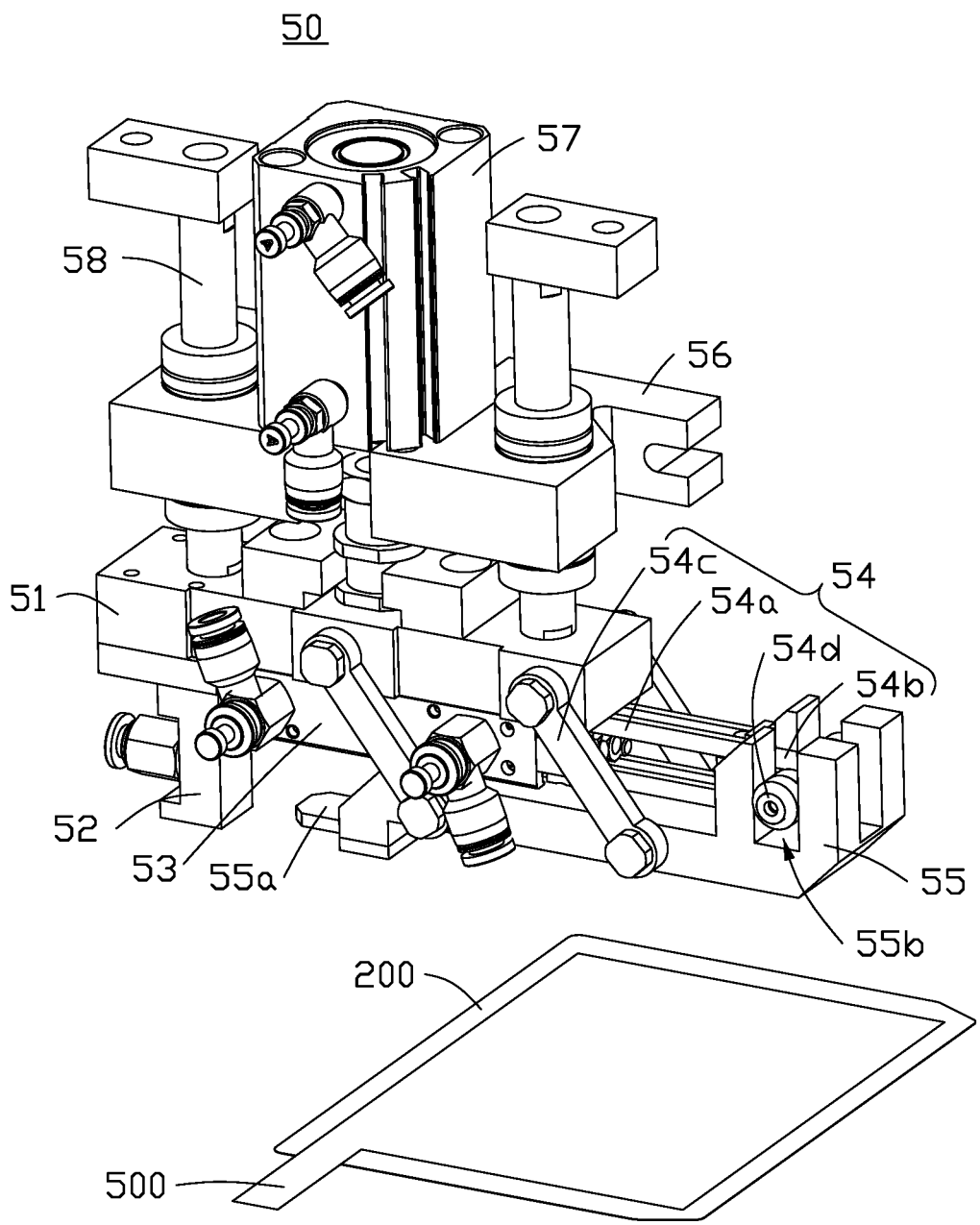
FIG. 10 is an isometric view of a second film-removing component according to an embodiment of this application.

FIG. 10 is an isometric view of a second film-removing component 50 according to an embodiment of this application. The second film-removing component 50 includes a supporting piece 51, a supporting piece 52, a pushing cylinder 53, a linkage mechanism 54, a pressing piece 55, a connecting piece 56, a lifting cylinder 57, and a sliding column 58. The supporting piece 51 is connected to the drive component 30. The supporting piece 52 and the pushing cylinder 53 are mounted on the supporting piece 51. The supporting piece 52 has an absorbing hole on the bottom. The absorbing hole is connected to an air pump to apply a vacuum to the area of the protective paper 500 beyond the sheet 200. The pressing piece 55 is connected to the pushing cylinder 53 by the linkage mechanism 54. The pushing cylinder 53 drives the pressing piece 55 to press the bottom of the supporting piece 52, so the supporting piece 52 and the pressing piece 55 can grip the protective paper 500 to tear off the protective paper 500. The connecting piece 56 is mounted on the rolling component 60 by screws, in order to connect the second film-removing component 50 to the rolling component 60 and the sheet selection component 20, the second film-removing component 50 can move with the sheet selection component 20. The sliding column 58 is mounted on the supporting piece 51 and extends through the connecting piece 56. The sliding column 58 is used for guiding the movement of the supporting piece 51. The lifting cylinder 57 is mounted on the connecting piece 56 and is used for driving the supporting piece 51 to move down to apply suction to the protective paper 500 or move up for lifting the protective paper 500. In an embodiment, the area of the protective paper 500 extending out of and beyond the sheet 200 is a rectangle. The pressing piece 55 has a tablet 55a on the side closer to the supporting piece 52. After the supporting piece 52 applies suction to the rectangular area of the protective paper 500, the lifting cylinder 57 lifts such area to a certain height to allow the tablet 55a to move to the bottom of the rectangle and press the rectangle area up to the supporting piece 52, preventing the rectangle from dropping when the protective paper 500 is torn off.

Figure 11:
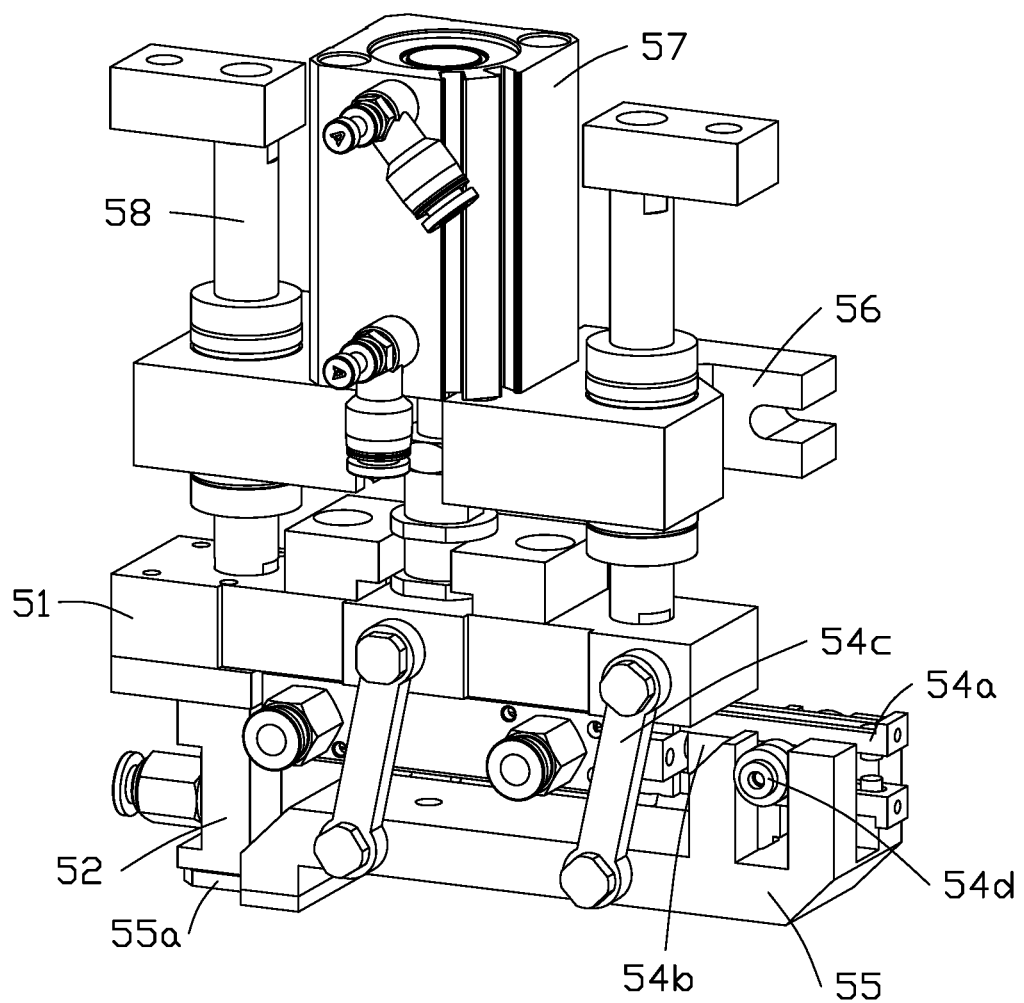
FIG. 11 is an isometric view of the second film-removing component of FIG. 10.

FIG. 10 shows the state where the pressing piece 55 is far away from the supporting piece 52, and FIG. 11 shows the state where the pressing piece 55 is close to the supporting piece 52. In an embodiment, the linkage mechanism 54 includes a guiding pole 54a, a pushing piece 54b, and a link 54c. The guiding pole 54a is located horizontally on the supporting piece 51. The pushing piece 54b is connected to the guiding pole 54a and is movable along the guiding pole 54a. The pushing piece 54b has a sliding part 54d. The sliding part 54d is a wheel, for decreasing the friction. The pressing piece 55 has a holding groove 55b. The holding groove 55b is vertical. The sliding part 54d is movably located in the holding groove 55b. The sliding part 54d is used for pushing against the wall of the holding groove 55b and pushing the pressing piece 55 to move. The pressing piece 55 is connected to the supporting piece 51 by four links 54c. The four links 54c are set in pairs on two sides of the pressing piece 55. The four links 54c are parallel and form a parallelogram structure. After the pushing cylinder 53 drives the pushing piece 54b to move along the guiding pole 54a, the sliding part 54d pushes against the wall of the holding groove 55b, to swing the pressing piece 55, to press or move away from the supporting piece 52, in order to grip or release the protective paper 500.

Figure 12:
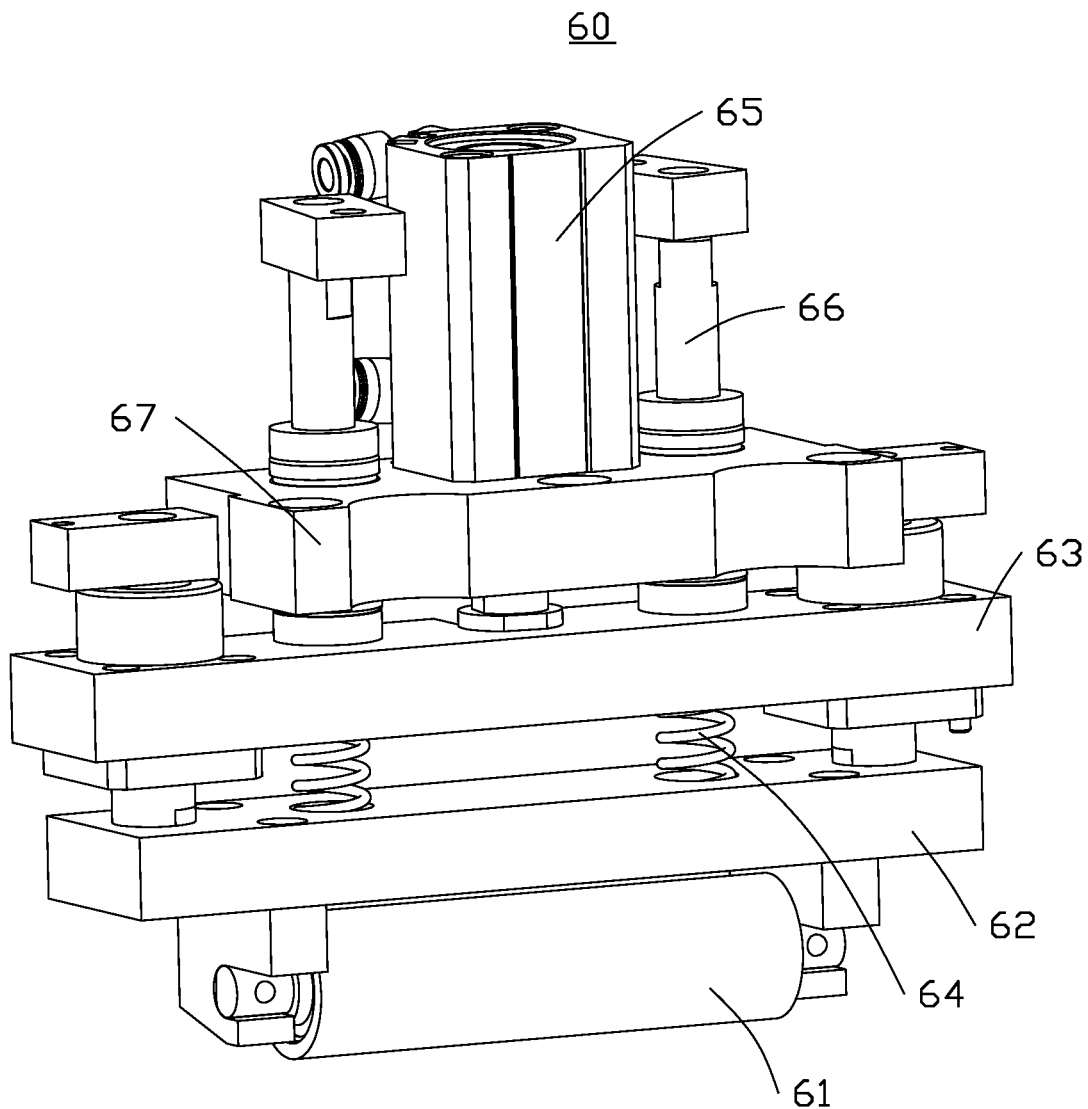
FIG. 12 is an isometric view of a rolling component according to an embodiment of this application.

As shown in FIG. 12, the rolling component 60 includes a roller 61, a moving part 62, a fixing part 63, a spring 64, a lifting cylinder 65, a straight rod 66, and a mounting board 67. The mounting board 67 is mounted on the fixing board 21, to connect the rolling component 60 to the sheet selection component 20, so the rolling component 60 moves with the sheet selection component 20. The lifting cylinder 65 is located on the top of the mounting board 67 and extends through the mounting board 67 to connect to the fixing part 63. The straight rod 66 is connected to the fixing part 63 and extends through the mounting board 67 to guide the movement of the fixing part 63. The roller 61 is mounted on the bottom of the moving part 62. The lifting cylinder 65 drives the roller 61 to press the sheet onto the workpiece, and the drive component 30 drives the rolling component 60 to move back and forth, so the roller 61 smooths the sheet 200.

Figure 13:
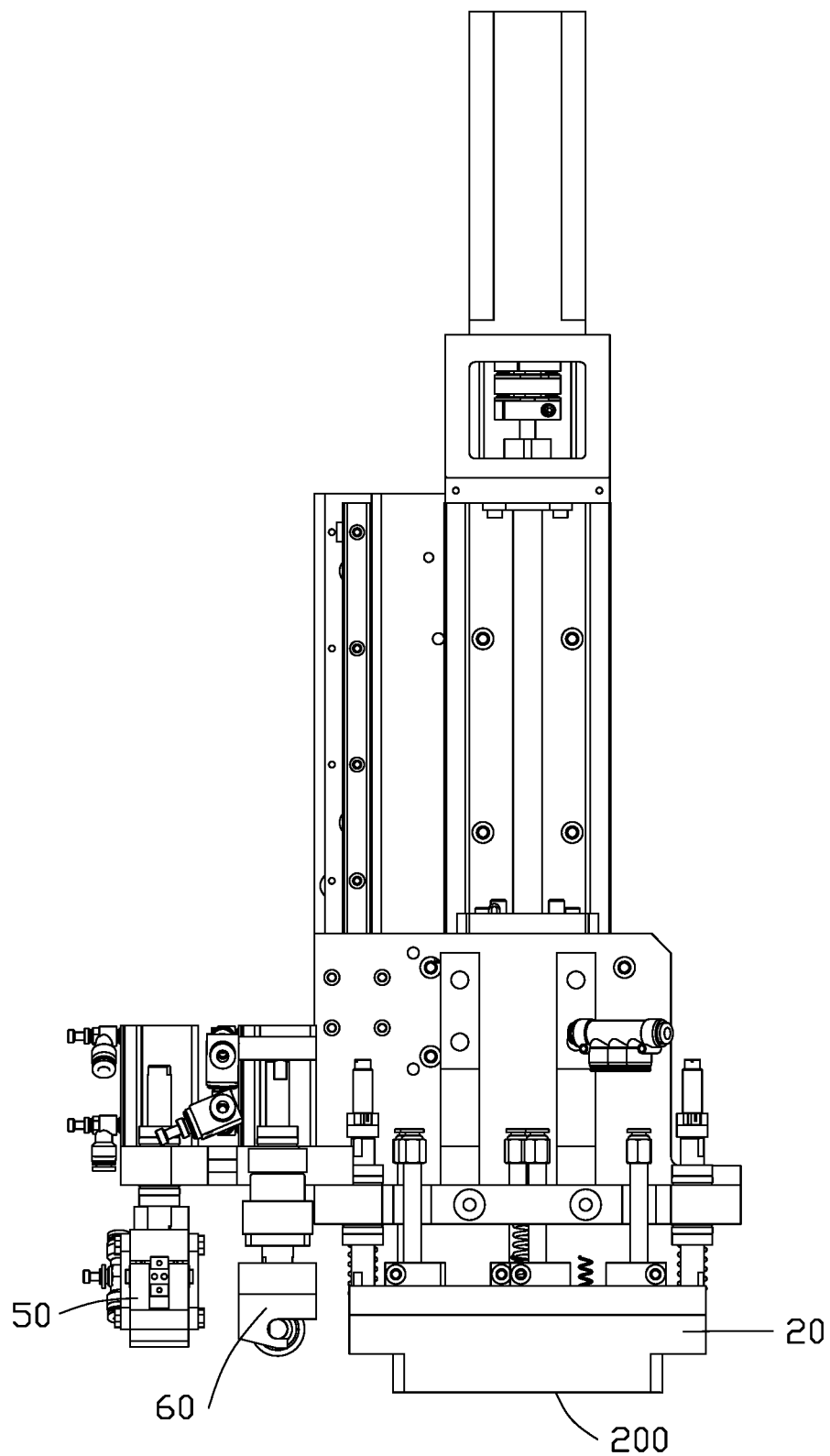
FIG. 13 is a side view of the rolling component, the sheet selection component, and the second film-removing component of FIG. 1.
Figure 14:
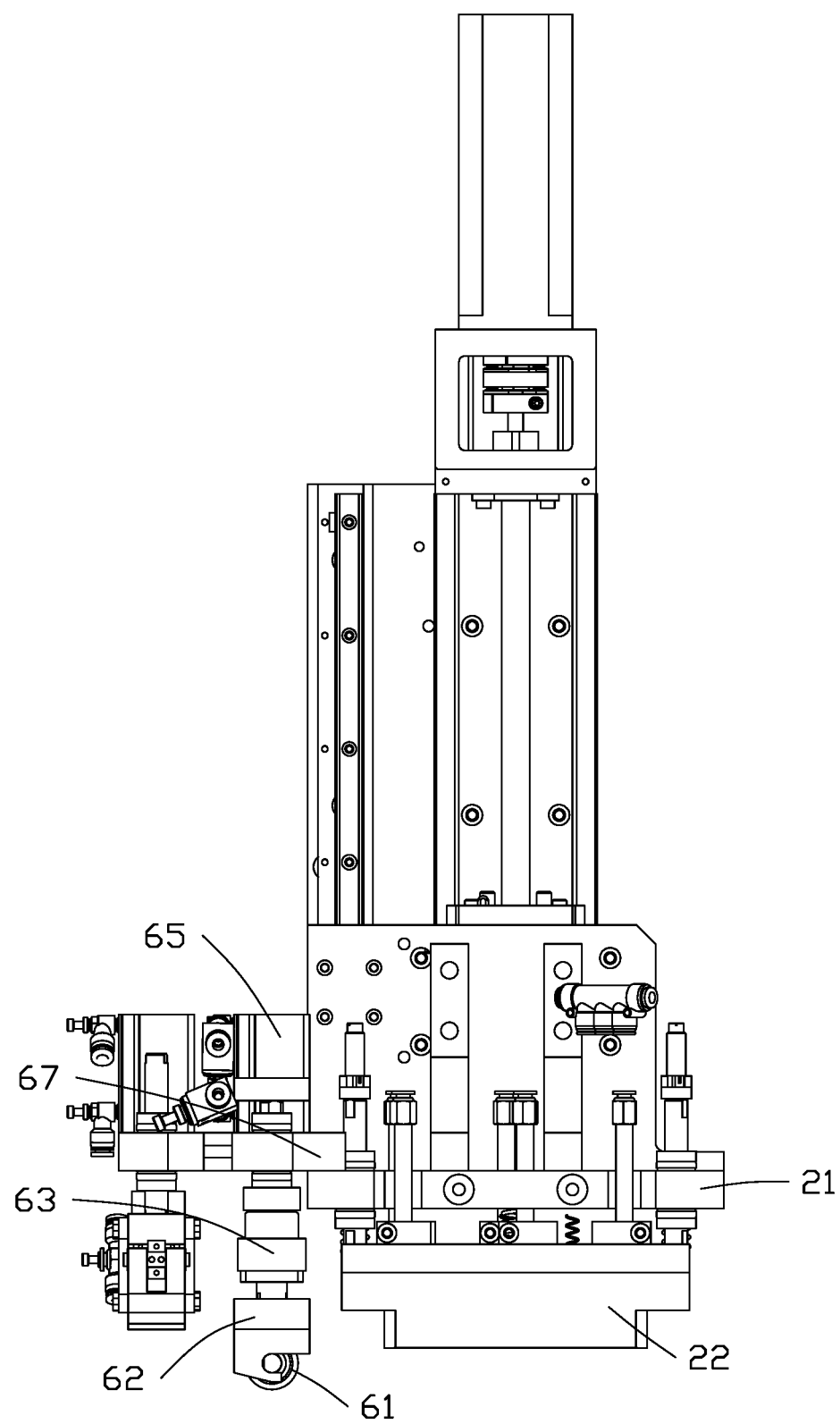
FIG. 14 is a side view of the rolling component, the sheet selection component, and the second film-removing component of FIG. 13.

As shown in FIGS. 13 and 14, after the sheet selection component 20 picks up the sheet 200, the supporting piece 22 is located below the rolling component 60 and the second film-removing component 50. After the sheet 200 is pasted to the workpiece, the lifting cylinder 65 drives the fixing part 63 to move down until the roller 61 is below the supporting piece 22, to press the sheet 200. Then the slide rail motor 33 drives the sheet selection component 20 to move back and forth, so the rolling component 60 smooths the sheet 200.

Figure 15:
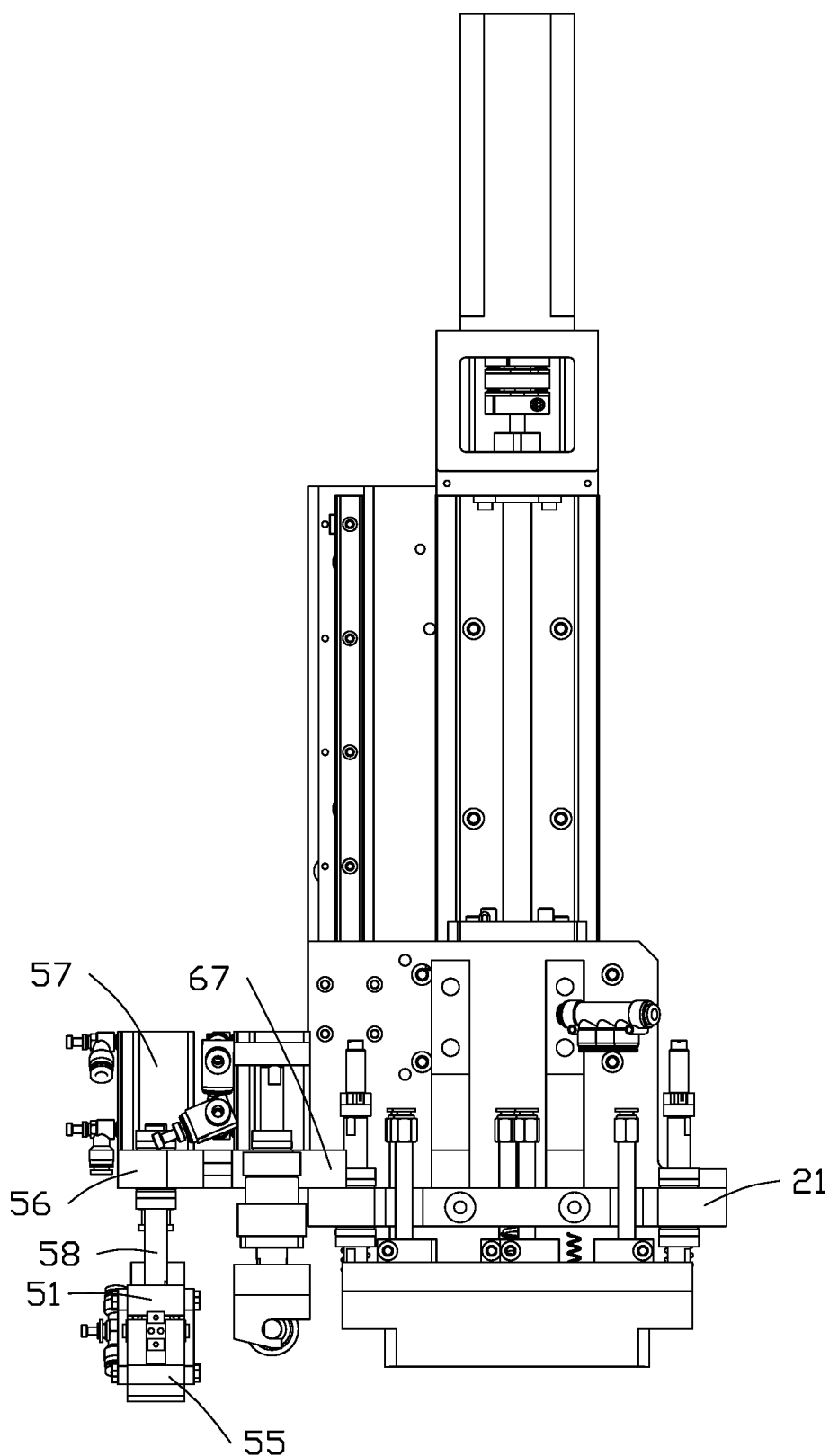
FIG. 15 is a side view of the rolling component, the sheet selection component, and the second film-removing component of FIG. 13.

As shown in FIG. 15, after the roller 61 smooths the sheet 200, the lifting cylinder 57 drives the supporting piece 51 to move down until the supporting piece 52 is below the supporting piece 22, to apply suction to the protective paper. Then the lifting cylinder 57 lifts the supporting piece 52, to allow the tablet 55a to move to the bottom of the protective paper and press the protective paper. Finally, the drive component 30 drives the sheet selection component 20 and the second film-removing component 50 to move to the second connecting hole 100c, to drive the second film-removing component 50 to tear away the protective paper and drop the protective paper into the storage box 40b.

Figure 16:
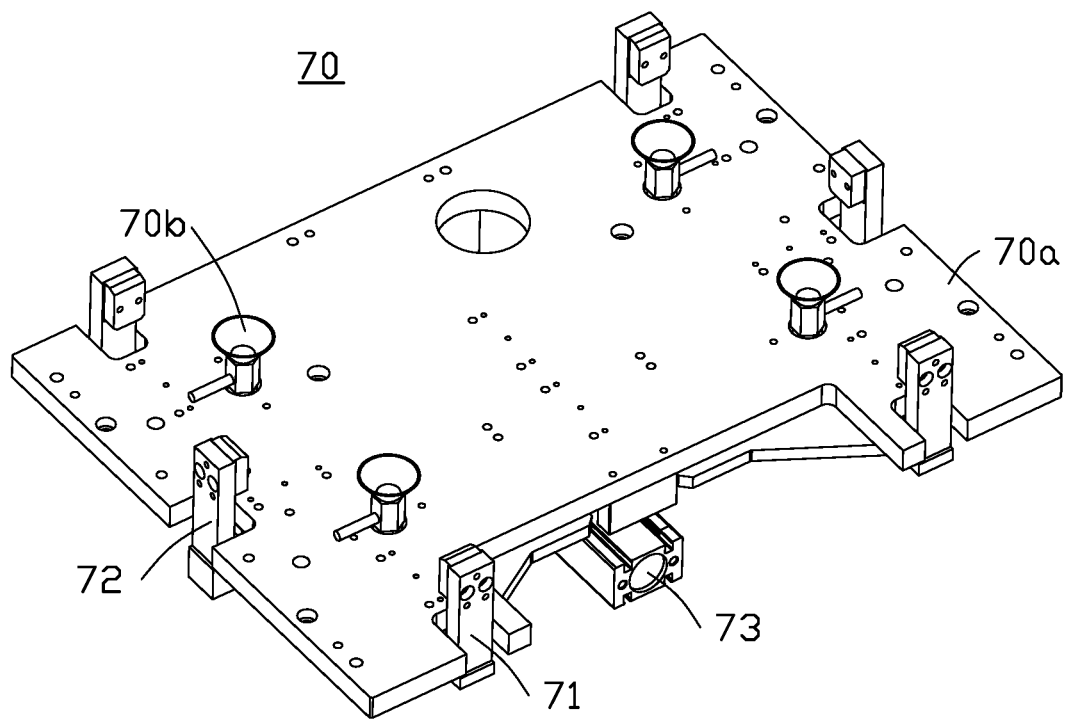
FIG. 16 is an isometric view of a carrier in the sticking machine of FIG. 1 according to an embodiment of this application.
Figure 17:
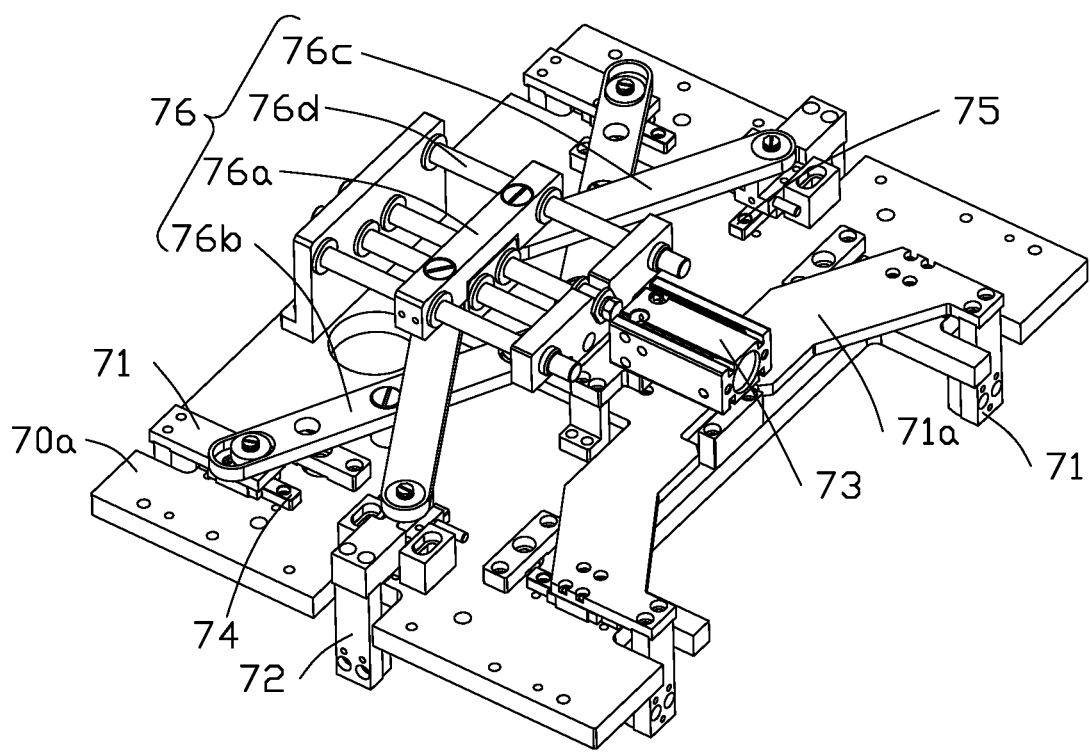
FIG. 17 is an isometric view of a bottom of the carrier of FIG. 16.

As shown in FIGS. 1, 16, and 17, the carrier 70 is located below the transmission line 80 and is used for positioning the workpiece 300. The carrier 70 includes a substrate 70a, at least two first centering pieces 71, at least two second centering pieces 72, a cylinder 73, a first trail 74, a second trail 75, and a link mechanism 76. The substrate 70a is used for supporting the workpiece 300. The first trail 74 and the second trail 75 are set in a first direction and a second direction respectively, and the second direction is perpendicular to the first direction. The first centering piece 71 and the second centering piece 72 are mounted on the first trail 74 and the second trail 75 respectively. The first centering piece 71 and the second centering piece 72 are used for positioning the workpiece 300 in the first direction and the second direction. The cylinder 73 is mounted on the substrate 70a. The cylinder 73 drives the first centering piece 71 and the second centering piece 72 to approach or move away from each other at the same time to position or release the workpiece 300 by the link mechanism 76, so the first centering piece 71 and the second centering piece 72 position the workpiece 300 along the two perpendicular midlines of the substrate 70.

In an embodiment, the link mechanism 76 includes a slider 76a, a first link rod 76b, a second link rod 76c, and a guiding post 76d. The slider 76a is connected to the cylinder 73. The guiding post 76d extends through the slider 76a. The guiding post 76d extends in the first direction and is used for guiding the movement of the slider 76a. Each first link rod 76b is rotatably connected to the substrate 70a at a position between the two ends of the first link rod 76b. The slider 76a and one first centering piece 71 are connected to each end of the first link rod 76b. The first centering piece 71 on other side is connected to the slider 76a and moves with the slider 76a. The slider 76a and one second centering piece 72 are connected to two ends of the second link rod 76c. After the slider 76a moves in the first direction, the first centering pieces 71 and the second centering pieces 72 on both sides approach each other to position the workpiece 300.

In an embodiment, there are two first centering pieces 71 symmetrically on two sides of the workpiece. There is one second centering piece 72 symmetrically on two sides of the workpiece. Wherein, the two first centering pieces 71 on the same side are connected to the slider 76a by a connecting board 71a. The substrate 70a has a number of suckers 70b. The sucker 70b are used for applying suction to the workpiece when positioned, preventing the workpiece from tilting up.

Figure 18A:
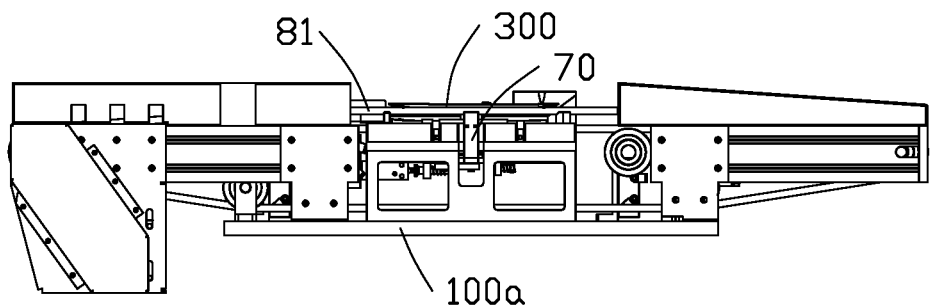
FIG. 18A is a side view of a workpiece lifted by a transmission line from a carrier according to an embodiment of this application.
Figure 18B:
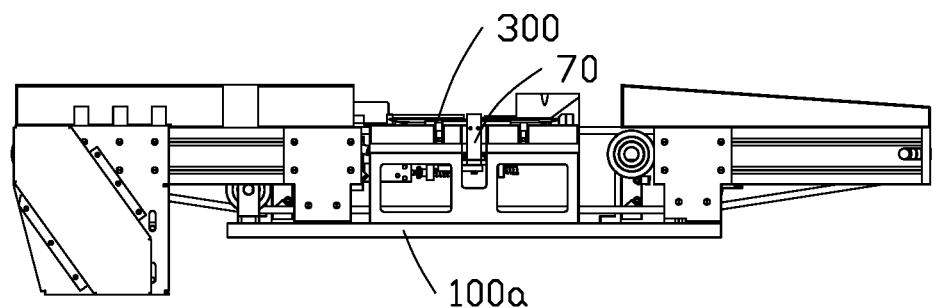
FIG. 18B is a side view of a workpiece released by a transmission line to a carrier according to an embodiment of this application.

As shown in FIGS. 1, 18A, and 18B, the carrier 70 is located below the transmission line 80 and is used for positioning the workpiece 300. The transmission line 80 includes two parallel belts 81. The workpiece is located on the belts 81. The belts 81 are used for supporting the workpiece 300. The carrier 70 is located below the belts 81. The belts 81 are movable upward or downward relative to the carrier 70. After the workpiece 300 moves above the carrier 70, the belts 81 move down to release the workpiece 300 onto the carrier 70, so the carrier 70 positions the workpiece 300. After the sheet is pasted on the workpiece 300, the belts 81 moves up to lift the workpiece 300 from the carrier 70, so the belts 81 carry the workpiece away.

Figure 19:
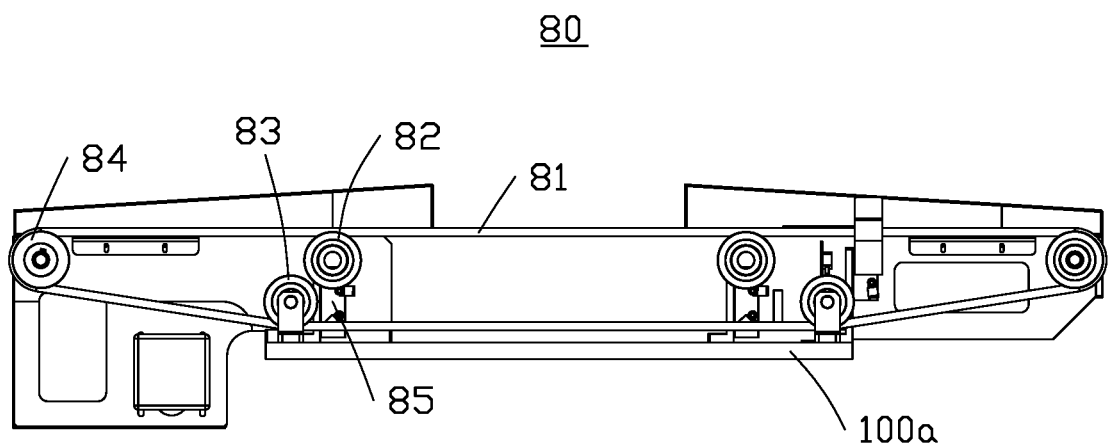
FIG. 19 is a side view of a transmission line according to an embodiment of this application.

As shown in FIG. 19, in order to realize the transmission of the workpiece 300 and the lifting of the belts 81, the transmission line 80 further includes two top-support-guide wheels 82, two bottom-support-guide wheels 83, two side-support-guide wheels 84, and two belt-lifting motors 85. The belts 81 are used for transmitting the workpiece. The bottom-support-guide wheels 83 are located on the base board 100a and are used for providing bottommost support for the belts 81. The side-support-guide wheels 84 are used for providing support at two ends of the belts 81. The top-support-guide wheel 82 are used for providing topmost support for the belts 81. The belt-lifting motors 85 are located on the base board 100a and are connected to the top-support-guide wheels 82. The belt-lifting motors 85 lift or drop the top-support-guide wheels 82, to lift or drop the belts 81 and the workpiece. When moving the workpiece, the belt-lifting motors 85 lift the workpiece, and when the workpiece moves to the top of the carrier 70, the belt-lifting motors 85 drop the belts 81 so that the workpiece falls onto the carrier 70, and then the carrier 70 centers the workpiece. After the workpiece is pasted with the sheet, the belt-lifting motors 85 lift the workpiece through the top-support-guide wheels 82, so that the transmission line 80 continues carrying the workpiece with the sheet to the next station.

Figure 20:
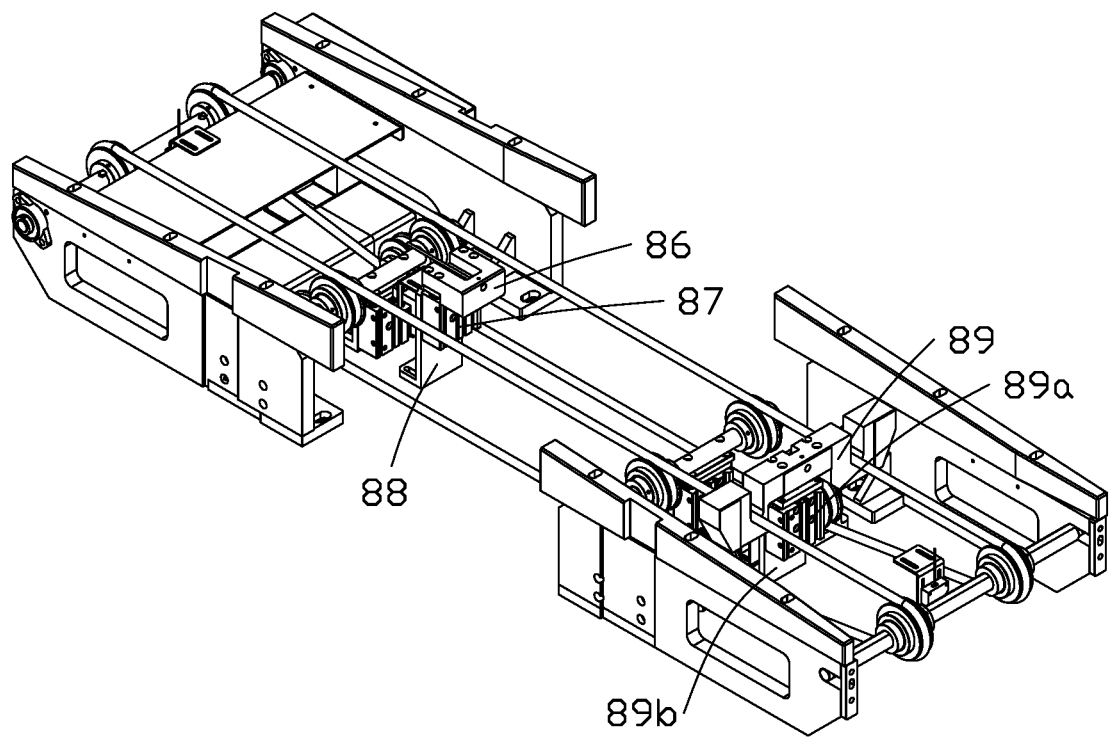
FIG. 20 is an isometric view of a transmission line according to an embodiment of this application.

As shown in FIG. 20, for stopping the sheet, in an embodiment, the transmission line 80 further includes a first stop piece 86, a first stop cylinder 87, a first bracket 88, a second stop piece 89, a second stop cylinder 89a, and a second bracket 89b. The first bracket 88 is located on the base board 100a. The first stop cylinder 87 is located on the first bracket 88. The first stop piece 86 is connected to the first stop cylinder 87. The first stop cylinder 87 lifts or drops the first stop piece 86. When the first stop piece 86 is lifted, the first stop piece 86 contacts the workpiece to stop the workpiece moving, so that the workpiece is located at a designated position above the carrier 70, preventing excessive movement of the workpiece. When the first stop piece 86 is dropped, the workpiece pasted with the sheet moves with the belt 81. The second bracket 89b is located on the base board 100a. The second stop cylinder 89a is located on the second bracket 89b and is connected to the second stop cylinder 89a. The second stop cylinder 89a lifts or drops the second stop piece 89. When the second stop piece 89 is lifted, the second stop piece 89 can stop the workpiece at the back, to prevent the rear workpiece from interfering with the front workpiece. When the second stop piece 89 is dropped, the workpiece at the back moves with the belts 81 to the designated position above the carrier 70.

The working process of the sticking machine 100 is that the slide rail motor 33 drives the sheet selection component 20, the second film-removing component 50, and the rolling component 60 to move along the slide rail 31 to the sheet supply component 10, the motor 14 drives the screw rod 15 to rotate, then the screw rod 15 lifts the lifting base 13 along the lifting track 12, so as to lift the moving piece 18, to lift the lower sheets 200 to the top height; the lifter 32 drives the adsorbing board 22 to move down, as shown in FIG. 13, the rolling component 60 and the second film-removing component 50 are above the adsorbing board 22; the adsorbing board 22 applies suction to the sheet 200 by the absorbing holes; after applying suction to the sheet 200, the lifter 32 drives the sheet selection component 20, the rolling component 60, and the second film-removing component 50 to move up together, the slide rail motor 33 drives the sheet selection component 20 to move along the slide rail 31 to the first film-removing component 40; the jaw cylinder 41 drives the first jaw 42 and the second jaw 43 together to grip the release paper 400 on the area extending from the sheet 200; the slide rail motor 33 drives the sheet selection component 20 to move along the slide rail 31, and during the movement, the release paper 400 is gradually torn off from the sheet 20; after the release paper 400 is torn off, the jaw cylinder 41 drives the first jaw 42 and the second jaw 43 to move away from each other to drop the release paper 400, to let the release paper 400 drop into the storage box 40b; the slide rail motor 33 drives the sheet selection component 20 to move along the slide rail 31 to the top of the carrier 70, the belt-lifting motor 85 drops the workpiece, meanwhile the first centering piece 71 and the second centering piece 72 position the workpiece, to position the workpiece symmetrically on the two perpendicular centerlines of the substrate 70a; the lifter 32 drives the sheet selection component 20 down to paste the adhesive surface of the sheet 200 to the workpiece; the supporting piece 22 of the sheet selection component 20 releases the vacuum, and the lifter 32 lifts the sheet selection component 20, the rolling component 60, and the second film-removing component 50 to move up; after the sheet selection component 20 moves up, the lifting cylinder 65 drives the fixing part 63 to move down until the roller 61 is below the supporting piece 22, to press the sheet 200, as shown in FIG. 14. Then the slide rail motor 33 of the drive component 30 drives the sheet selection component 20 to move back and forth one or more times, so the rolling component 60 moves back and forth to smooth the sheet 200 on the workpiece; after the rolling, the lifting cylinder 65 drives the fixing part 63 to move up to reset; the lifting cylinder 57 of the second film-removing component 50 drives the supporting piece 51 to move down, as shown in FIG. 15, until the supporting piece 51 is below the rolling component 60 and the sheet selection component 20, so that the area of the protective paper 500 extending from the sheet 200 is under the supporting piece 52; the supporting piece 52 applies suction to the protective paper 500, meanwhile the pushing piece 54b pulls the guiding pole 54a to move back along the guiding pole 54a, the sliding part 54d pushes the wall of the holding groove 55b, so that the pressing piece 55 swings under the limit of the link 54c to press the supporting piece 52, so as to grip the protective paper 500; the slide rail motor 33 drives the sheet selection component 20 to move back, to tear off the protective paper 500 from the sheet 200; the slide rail motor 33 drives the second film-removing component 50 and the protective paper 500 to move together to the block wall 40a, then the pushing cylinder 53 moves the pushing piece 54b along the guiding pole 54a to reset, to drop the protective paper 500, meanwhile the vacuum in the supporting piece 52 is released, so that the protective paper 500 drops into the storage box 40b through the second connecting hole 100c; after the sheet 200 is pasted, the belt-lifting motors 85 lift the workpiece, to allow the transmission line 80 to move the workpiece on; finally, the slide rail motor 33 drives the sheet selection component 20 to move back to the sheet supply component 10, by repeating the process above-mentioned to paste another sheet 200.

This application also provides an assembly line for sticking sheets (not shown in figures) of an embodiment and includes the sticking machine 100 mentioned above.

In some other embodiments, the drive component 30 can also be driven in forward and reverse directions, such as in the same direction as the transmission line 80, so as to drive the rolling component 60 to better press the workpieces.

The sticking machine 100 mentioned above realizes the purpose of automatically sticking the sheet to the workpiece, improving the efficiency and accuracy for mounting sheets, through the sheet selection component 20 picking sheets up from the sheet supply component 10, and then through the first film-removing component 40 to tear off the release paper, and then through the sheet selection component 20 sticking the sheet to the workpiece, and finally through the second film-removing component 50 tearing off the protective paper.

In addition, those of ordinary skill in the art should recognize that the above embodiments are only used to illustrate the present application, rather than to limit the present application. As long as it is within the scope of the essential spirit of the application, appropriate changes and changes made to the above embodiments fall within the disclosure scope of the application.

What is claimed is:

1. A sticking machine comprising:
a sheet supply component configured for storing sheets;
a sheet selection component configured for applying a suction force to the sheets stored in the sheet supply component;
a first film-removing component;
a second film-removing component connected to the sheet selection component;
a carrier configured for positioning a workpiece;
a transmission line located above the carrier and configured for transmitting the workpiece to the carrier;
a drive component connected to the sheet selection component and the second film-removing component; and
a base board configured for supporting the sheet supply component, the first film-removing component, the drive component, the carrier, and the transmission line;
wherein the drive component drives the sheet selection component to move above the first film-removing component after the sheet selection component picks up a sheet from the sheets stored in the sheet supply component, the first film-removing component grips a first film on the sheet, the drive component and the first film-removing component move to tear off the first film from the sheet, the drive component moves the sheet selection component to the workpiece on the carrier, the sheet selection component pastes the sheet to the workpiece, the second film-removing component grips a second film on the sheet, the drive component and the second film-removing component move to tear off the second film from the sheet.

2. The sticking machine of claim 1, wherein:
the sticking machine further comprises a rolling component, the rolling component is located between the sheet selection component and the second film-removing component, the rolling component is configured for smoothing the sheet on the workpiece, the rolling component comprises a roller and a lifting cylinder, the roller is configured for pressing the sheet on the workpiece.

3. The sticking machine of claim 1, wherein:
the first film-removing component is located on the base board, the first film-removing component comprises a jaw cylinder, a first jaw, and a second jaw, the first jaw and the second jaw are configured for cooperatively gripping the first film, the jaw cylinder is located on the base board, the jaw cylinder moves the first jaw and the second jaw closer to or away from each other to grip or release the first film.

4. The sticking machine of claim 1, wherein:
the first film-removing component is rotatably connected to the base board, the first film-removing component comprises a jaw cylinder, a first jaw, a second jaw, a cube cylinder, an arc track, a connecting piece, a link, and a bearing, one end of the connecting piece is connected to the cube cylinder, the other end of the connecting piece is connected to one end of the link, the other end of the link is connected to the bearing, the bearing is mounted in the arc track, the jaw cylinder is connect to the link, wherein as the cube cylinder drives the connecting piece to move, the connecting piece rotates each of the link, the jaw cylinder, the first jaw, and the second jaw.

5. The sticking machine of claim 1, wherein:
the base board defines a first connecting hole and a second connecting hole, the first connecting hole is positioned for the first film to drop through, the second connecting hole is located on a side of the first film-removing component closer to the transmission line, and the second connecting hole is positioned for the second film to drop through.

6. The sticking machine of claim 5, wherein:
each of the first connecting hole and the second connecting hole is communicated to a storage box, the first film and the second film drop into the storage box.

7. The sticking machine of claim 1, wherein:
the sheet selection component comprises a fixing board, an adsorbing board, a spring, and a guiding piece, the fixing board is mounted on the drive component, the adsorbing board is located below the fixing board, one end of the guiding piece is connected to the adsorbing board, the other end of the guiding piece extend through the fixing board; the spring is between the fixing board and the adsorbing board, the spring pushes the adsorbing board downward, the adsorbing board defines a plurality of absorbing holes for applying the suction force to the sheets in the sheet supply component.

8. The sticking machine of claim 1, wherein:
the second film-removing component comprises a supporting piece, a supporting piece, a pushing cylinder, a linkage mechanism, and a pressing piece, the supporting piece is mounted on the drive component, the supporting piece and the pushing cylinder are mounted on the supporting piece, the supporting piece defines an absorbing hole for applying the suction force to the second film, the pressing piece connects to the pushing cylinder by the linkage mechanism, the pushing cylinder presses the pressing piece against the supporting piece, the supporting piece and the pressing piece are configured for cooperatively gripping the second film.

9. The sticking machine of claim 8, wherein:
the linkage mechanism comprises a guiding pole, a pushing piece, and a link, the guiding pole is mounted on the supporting piece, the pushing piece is connected to the guiding pole, the pushing piece comprises a sliding part, the pressing piece defines a holding groove, the sliding part is located in the holding groove, the pressing piece is connected to the supporting piece by the link, the pushing cylinder swings the pressing piece towards the supporting piece.

10. The sticking machine of claim 1, wherein:
the carrier comprises a substrate, at least two first centering pieces, at least two second centering pieces, a cylinder, a first trail, a second trail, and a link mechanism, the substrate supports the workpiece, the first trail and the second trail extend in a first direction and a second direction, respectively, the first centering piece and the second centering piece are mounted on the substrate and are configured for gripping the sheet, the cylinder is located on the substrate, the cylinder moves the first centering piece and the second centering piece by the link mechanism closer to or away from each other to grip or release the sheet.

11. The sticking machine of claim 10, wherein:
the link mechanism comprises a slider, a first link rod, a second link rod and a guiding post, the slider is connected to the cylinder and the guiding post, the guiding post extends in the first direction to guide the slider, the first link rod is rotatably mounted on the substrate, the slider and the first centering piece on same side are connected to the two ends of the first link rod, respectively, the first centering piece on opposite side is connected to the slider, the slider and the second centering piece are connected to the two ends of the second link rod, respectively, the slider moves in the first direction, the first centering pieces and the second centering pieces are configured for cooperatively gripping the sheet.

12. The sticking machine of claim 1, wherein:
the transmission line comprises two belts which are parallel to each other, a top-support-guide wheel, a bottom-support-guide wheel, a side-support-guide wheel, and a belt-lifting motor, each of the two belts is configured for transmitting the workpiece, the bottom-support-guide wheel, the side-support-guide wheel, and the bottom-support-guide wheel support the two belts, the belt-lifting motor connects to the top-support-guide wheel to lift or to drop the top-support-guide wheel and the two belts.

13. A sticking machine comprising:
a sheet supply component configured for storing sheet with an upper film and a lower film on both sides;
a sheet selection component configured for applying a suction force to the sheets stored in the sheet supply component;
a drive component connected to the sheet selection component and configured for moving the sheet selection component in a first direction and a second direction;
a first film-removing component;
a second film-removing component connected to the sheet selection component;
a carrier configured for positioning a workpiece; and
a transmission line located above the carrier;
wherein the transmission line extends in a third direction and configured for transmitting the workpiece in the third direction to the carrier;
wherein the drive component drives the sheet selection component to move in first direction to the sheet supply component for picking up the sheet from the sheets stored in the sheet supply component, the drive component and the first film-removing component tear off the lower film from the sheet, the drive component drives the sheet selection component to move in the second direction to press the sheet onto the workpiece, the drive component and the second film-removing component move to tear off the upper film from the sheet.

14. The sticking machine of claim 13, wherein:
the sticking machine further comprises a rolling component, the rolling component is located between the sheet selection component and the second film-removing component, the rolling component is configured for smoothing the sheet on the workpiece, the rolling component comprises a roller and a lifting cylinder, the roller is configured for pressing the sheet onto the workpiece.

15. The sticking machine of claim 13, wherein:
the first film-removing component comprises a jaw cylinder, a first jaw, and a second jaw, the first jaw and the second jaw are configured for cooperatively gripping the lower film, the jaw cylinder drives the first jaw and the second jaw to move closer to or away from each other to grip or release the lower film.

16. The sticking machine of claim 13, wherein:
the first film-removing component comprises a jaw cylinder, a first jaw, a second jaw, a cube cylinder, an arc track, a connecting piece, a link, and a bearing, one end of the connecting piece is connected to the cube cylinder, the other end of the connecting piece is connected to one end of the link, the other end of the link is connected to the bearing, the bearing is mounted in the arc track, the jaw cylinder connects the link, wherein as the cube cylinder drives the connecting piece to move, the connecting piece rotates each of the link, the jaw cylinder, the first jaw, and the second jaw.

17. The sticking machine of claim 13, wherein:
the second film-removing component comprises a supporting piece, a supporting piece, a pushing cylinder, a linkage mechanism, and a pressing piece, the supporting piece is mounted on the drive component, the supporting piece and the pushing cylinder are mounted on the supporting piece, the supporting piece defines an absorbing hole for applying the suction force to the upper film, the pressing piece connects to the pushing cylinder by the linkage mechanism, the pushing cylinder drives the pressing piece to press against the supporting piece, the supporting piece and the pressing piece are configured for cooperatively gripping the upper film.

18. The sticking machine of claim 13, wherein:
the sticking machine further comprises a base board supporting the sheet supply component, the first film-removing component, the drive component, the carrier, and the transmission line, the base board defines a first connecting hole and a second connecting hole, the second connecting hole is located on the side of the first film-removing component closer to the transmission line, the first connecting hole and the second connecting hole are communicated to storage box, the storage box is configured for storing the upper film and the lower film.

* * * * *